(12) United States Patent
Neves et al.

(10) Patent No.: US 7,113,599 B2
(45) Date of Patent: Sep. 26, 2006

(54) LOCATION-INDEPENDENT PACKET ROUTING AND SECURE ACCESS IN A SHORT-RANGE WIRELESS NETWORKING ENVIRONMENT

(75) Inventors: Richard Kent Neves, Tarrytown, NY (US); Sandeep Kishan Singhal, Englewood Cliffs, NJ (US); Rangachari Anand, Teaneck, NJ (US); Ajei Sarat Gopal, Riverdale, NY (US); Yoonho Park, Chappaqua, NY (US)

(73) Assignee: Symantec Corporation, Cupertino, CA (US)

( * ) Notice: Subject to any disclaimer, the term of this patent is extended or adjusted under 35 U.S.C. 154(b) by 325 days.

(21) Appl. No.: 10/688,576

(22) Filed: Oct. 18, 2003

(65) Prior Publication Data

US 2004/0086123 A1    May 6, 2004

Related U.S. Application Data

(63) Continuation of application No. 09/657,745, filed on Sep. 8, 2000, now Pat. No. 6,691,227.

(51) Int. Cl.
*G06F 11/30* (2006.01)
(52) U.S. Cl. .......................... 380/270; 380/37
(58) Field of Classification Search ............ 380/270, 380/37
See application file for complete search history.

(56) References Cited

U.S. PATENT DOCUMENTS

| 5,737,318 | A | 4/1998 | Melnik |
| 5,751,704 | A | 5/1998 | Kostic et al. |
| 5,752,193 | A | 5/1998 | Scholefield et al. |
| 6,249,252 | B1 | 6/2001 | Dupray |
| 6,351,646 | B1 | 2/2002 | Jellema et al. |
| 6,452,498 | B1 | 9/2002 | Stewart |
| 6,493,539 | B1 | 12/2002 | Falco et al. |
| 6,526,275 | B1 | 2/2003 | Calvert |
| 6,535,493 | B1 | 3/2003 | Lee et al. |
| 6,549,625 | B1 | 4/2003 | Rautila et al. |
| 6,606,323 | B1 | 8/2003 | Ramamurthy et al. |
| 6,650,902 | B1 | 11/2003 | Richton |
| 2001/0044305 | A1 | 11/2001 | Reddy et al. |
| 2002/0035699 | A1 | 3/2002 | Crosble |

(Continued)

FOREIGN PATENT DOCUMENTS

EP          0740440 A2     10/1996

(Continued)

OTHER PUBLICATIONS

Aziz, A. et al, "Privacy and Authentication for Wireless Local Area Networks: A Secure Communications Protocol to Prevent Unauthorized Access", IEEE Personal Communications, IEEE Communications Society. US. vol. 1, No. 1,1994. pp. 25-31, XP000460718, ISSN: 1070-9916.

(Continued)

*Primary Examiner*—Thomas R. Peeso
(74) *Attorney, Agent, or Firm*—Fenwick & West LLP

(57) ABSTRACT

The present invention provides methods, systems, and computer program instructions for providing location-independent packet routing and secure access in a wireless networking environment (such as that encountered within a building), enabling client devices to travel seamlessly within the environment. Each client device uses a constant address. An address translation process that is transparent to the client and server is automatically performed as the device roams through the environment, enabling efficient client migration from one supporting access point to another. The secure access techniques provide user-centric authentication and allow policy-driven packet filtering, while taking advantage of encryption capabilities that are built in to the hardware at each endpoint.

19 Claims, 15 Drawing Sheets

U.S. PATENT DOCUMENTS

| | | |
|---|---|---|
| 2002/0160806 A1 | 10/2002 | Arazi et al. |
| 2003/0004758 A1 | 1/2003 | Luttrell |
| 2003/0139180 A1 | 7/2003 | McIntosh et al. |
| 2003/0224795 A1 | 12/2003 | Wilhoite et al. |

FOREIGN PATENT DOCUMENTS

| | | |
|---|---|---|
| EP | 0483551 B1 | 1/1997 |
| EP | 0589522 B1 | 3/1997 |
| EP | 0851633 A2 | 7/1998 |
| EP | 0 917 328 A2 | 5/1999 |
| EP | 0917 328 A2 | 5/1999 |
| EP | 0 944 203 A2 | 9/1999 |
| EP | 1 139 632 A2 | 10/2001 |
| WO | WO 00/69186 A1 | 11/2000 |
| WO | WO 01 06734 A2 | 1/2001 |
| WO | WO 01 28185 A1 | 4/2001 |
| WO | WO 01/58177 A2 | 8/2001 |

OTHER PUBLICATIONS

Bharghavan, V., "Secure Wireless LANs", 2nd ACM Conference on Computer and Communications Security, Nov. 2, 1994, pp. 10-17, XP002155490.

GlobeCom '93., IEEE Houston, TX, USA, Nov. 29-Dec. 2, 1993, New York, NY, USA, IEEE, Nov. 29, 1993, pp. 550-554, XP010109722, ISBN: 0-7803-09 17-0.

Haartsen, J., "Bluetooth: Vision, Goals, and Architecture", Mobile Computing and Communications Review, ACM, New York, NY, US, vol. 2, No. 4, Oct. 1, 1998, pp. 38-45, XP000784002.

Hung-Yu, Lin et al., "Authentication in Wireless Communications", Global Telecommunications Conference, 1993, including a Communications Theory Mini-Conference. Technical Program Conference Record, IEEE in Houston, TX, USA.

Jue, J. P., et al., "Design and analysis of replicated servers to support IP-host mobility in enterprise networks", COMMUNICATIONS, 1997. ICC '97 Montreal, Que., Canada Jun. 8-12, 1997, New York, NY, USA, IEEE, US, Jun. 8, 1997, pp. 1256-1260, XP010226957 ISBN: 0-7803-3925-8.

Srisuresh P., et al., IP Network Address Translator (NAT) Terminology and Considerations, XP-002204216, Request for Comments 2663, published by The Internet Society, Aug. 1999.

"3Com Introduces Industry's First Layer 3 Wireless LAN Security Solution", published at http://www.3com.com/news/releases/pr00/jul0500a.html, Jul. 5, 2000, Santa Clara, CA.

Snoeren, A., et al. "An End-to-End Approach to Host Mobility", 6th ACM/IEEE International Conference on Mobile Computing and Networking (MobiCom '00), Aug. 2000, Boston, MA.

Aziz, A., et al. "Privacy and Authentication for Wireless Local Area Networks: A Secure Communications Protocol to Prevent Unauthorized Access", IEEE Personal Communications, IEEE Communications Society, US, vol. 1, No. 1, 1994, pp. 25-31, XP000460718, ISSN: 1070-9916.

Bharghavan, V. "Secure Wireless LANs", 2nd ACM Conference on Computer and Communications Security, Nov. 2, 1994, pp. 10-17, XP002155490.

Lin, Hung-Yu, et al. "Authentication in Wireless Communications", Global Telecommunications Conference, 1993, including a Communications Theory Mini-Conference, Technical Program Conference Record, IEEE in Houston GlobeCom '93, IEEE Houston, TX, USA, Nov. 29-Dec. 2, 1993, New York, NY, USA, IEEE, Nov. 29, 1993, pp. 550-554, XP010109722, ISBN: 0-7803-0917-0.

Haartsen, J., et al. "Bluetooth: Vision, Goals, and Architecture", Mobile Computing and Communications Review, ACM, New York, NY, US, vol. 2, No. 4, Oct. 1, 1998, pp. 38-45, XP000784002.

Jue, J P, et al. "Design and analysis of replicated servers to support IP-host mobility in enterprise networks", COMMUNICATIONS, 1997. ICC '97 Montreal, Que., Canada Jun. 8-12, 1997, New York, NY, USA, IEEE, US, Jun. 8, 1997, pp. 1256-1260, XP010226957 ISBN: 0-7803-3925-8.

Srisuresh, P. et al. "IP Network Address Translator (NAT) Terminology and Considerations", XP-002204216, Request for Comments 2663, published by The Internet Society, Aug. 1999.

Notification of Transmittal of the International Search Report, PCT/US01/26659, Feb. 18, 2002, 6 pages.

Notification of Transmittal of the international Search Report, PCT/US01/26520, Jan. 24, 2003, 9 pages.

Notification of Transmittal of the International Preliminary Examination Report, PCT/US01/26659, Oct. 23, 2002, 8 pages.

European Search Report, EP 01966271.7, 4 pages.

Notification of Transmittal of the international Search Report, PCT/US01/24821, Aug. 30, 2002, 7 pages.

Prasad, A. et al, "Security Architecture for Wireless LANs: Corporate & Public Environment," VTC 2000-SPRING, 2000 IEEE 51st. Vehicular Technology Conference Proceedings. Tokyo, Japan, May 15-18, 2000.

European Search Report, EP 01966271.7, 4 pages.

Prasad, A. et al, "Security Architecture for Wireless LANs: Corporate & Public Environment," VTC 2000-SPRING, 2000 IEEE 51st. Vehicular Technology Conference Proceedings. Tokyo, Japan, May 15-18, 2000.

FIG. 1
(PRIOR ART)

| Protocol | Client Addr | Client Port | Server Addr | Server Port | Masquerade Addr | Masquerade Port |

FIG. 4

| Protocol | Client Addr | Client Port | Server Addr | Server Port | Masquerade Addr | Masquerade Port | FAM Addr | FAM Port |

FIG. 5

| Protocol | Server Addr | Server Port | Masquerade Addr | Masquerade Port | FAM Addr | FAM Port |

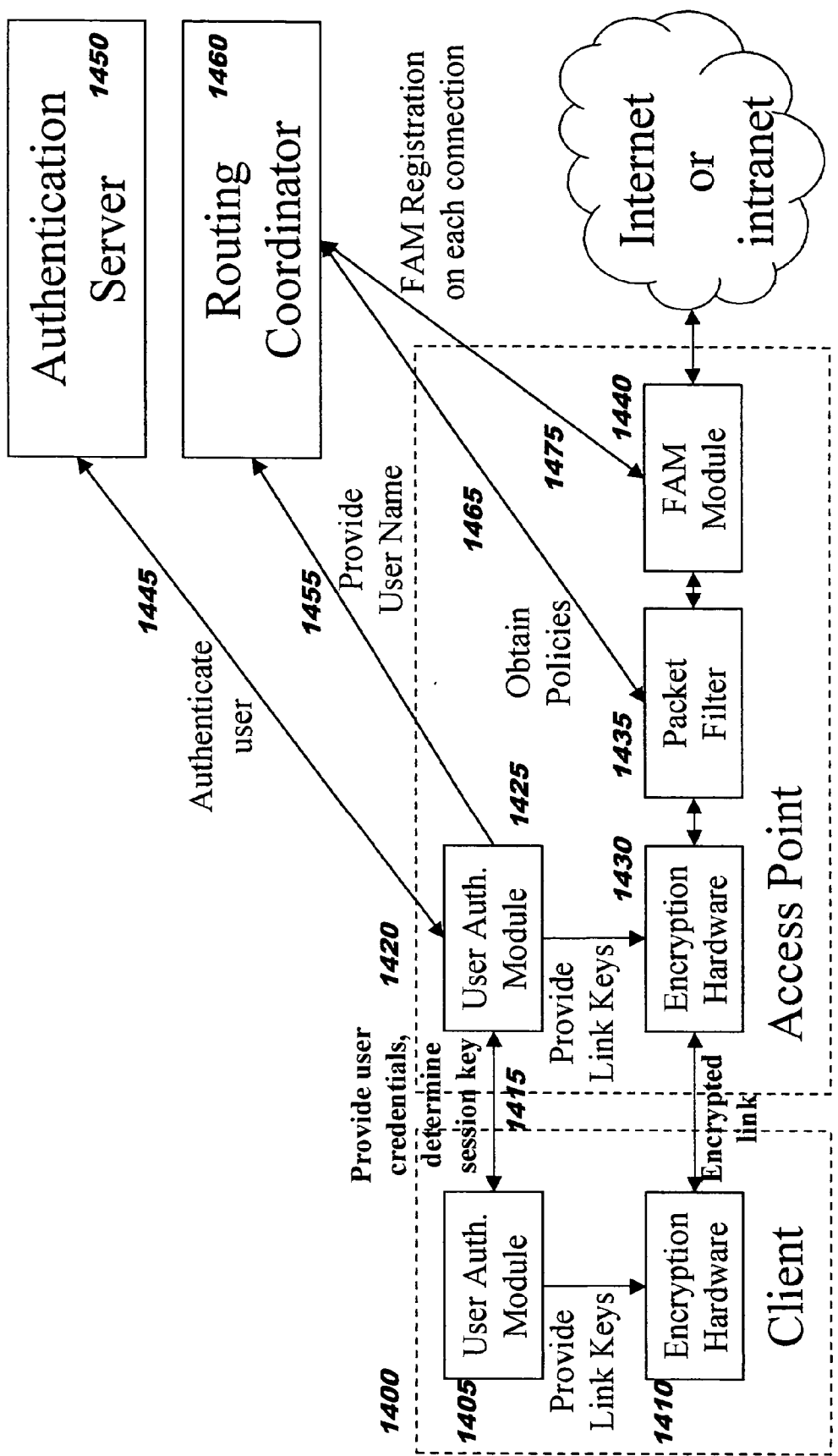

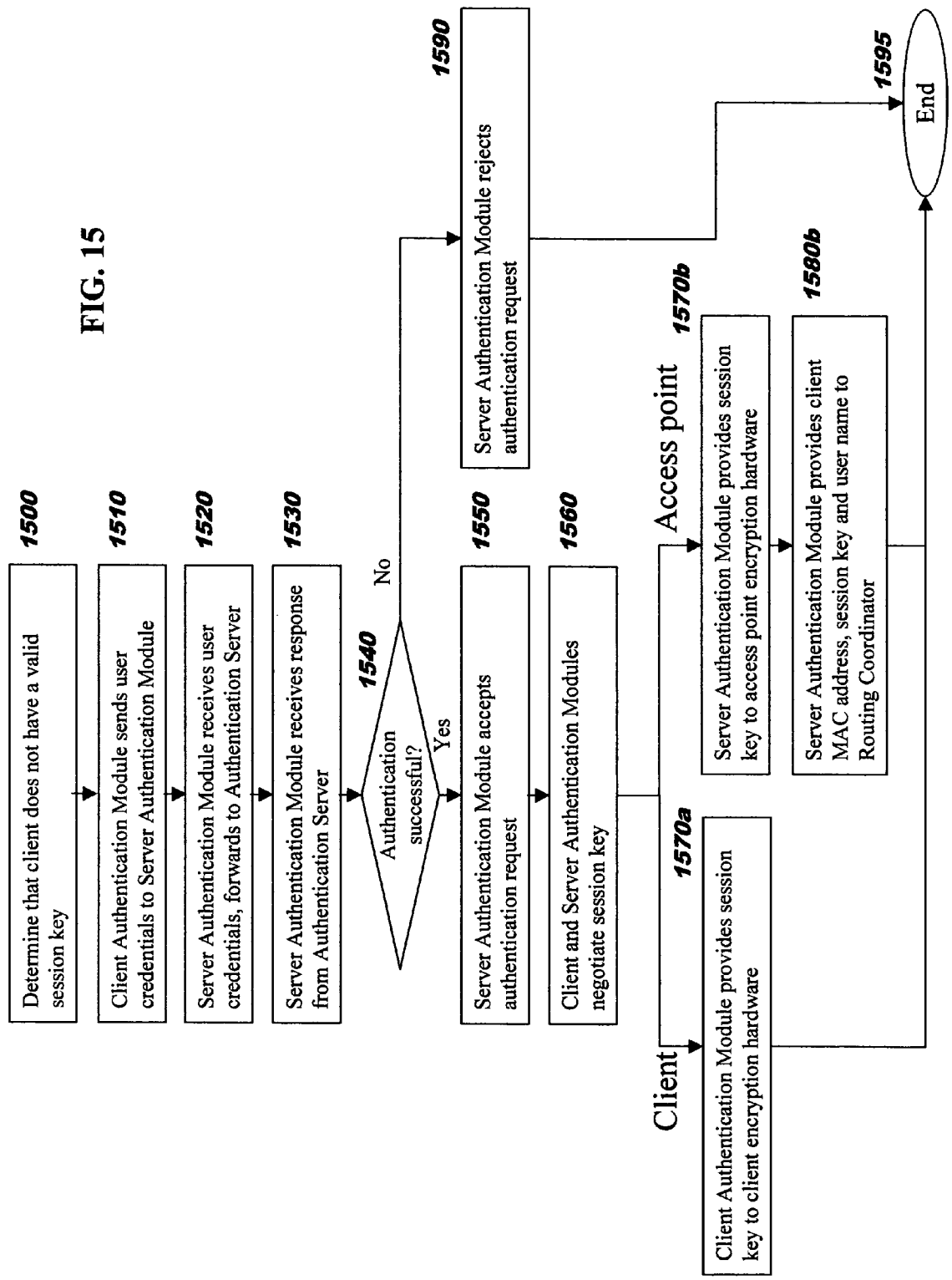

LOCATION-INDEPENDENT PACKET ROUTING AND SECURE ACCESS IN A SHORT-RANGE WIRELESS NETWORKING ENVIRONMENT

CROSS-REFERENCE TO RELATED APPLICATIONS

The present invention is a continuation of U.S. application Ser. No. 09/657,745, filed Sep. 8, 2000 (now U.S Pat. No. 6,691,227), which is hereby incorporated herein by reference. The present invention is related to U.S. application Ser. No. 09/637,742, filed Aug. 11, 2000 (now U.S. Pat. No. 6,633,761), entitled "Enabling Seamless User Mobility in a Short-Range Wireless Networking Environment", which is hereby incorporated herein by reference.

FIELD OF THE INVENTION

The present invention relates to computer networks, and more particularly to methods, systems, and computer program instructions for routing packets and providing secure network access for short-range wireless computing devices.

BACKGROUND OF THE INVENTION

In recent years, various short-range wireless network communications technologies, notably IEEE 802.11 and Bluetooth, have emerged to enable portable devices (such as laptops, cellular phones, personal digital assistants or PDAs, etc.) to communicate both with each other and with wide-area networking environments. (IEEE 802.11 is a standard of the Institute for Electrical and Electronics Engineers, which was approved in 1997 for wireless Local Area Network, or LAN, signaling and protocols. 802.11 addresses frequency hopping spread spectrum radio, direct sequence spread spectrum radio, and infrared light transmissions. Bluetooth is a specification for short-range wireless connectivity that is aimed at unifying telecommunications and computing. More information on these specifications can be found on the Internet at www.ieee.org and www.bluetooth.com, respectively.)

The problem of host mobility within this environment is well known in the prior art, and several solutions have been defined to address the problem. Among these are Mobile IP (Internet Protocol), an end-to-end TCP (Transmission Control Protocol) re-mapping approach, and the HAWAII (Handoff-Aware Wireless Access Internet Infrastructure) system. Each of these solutions, along with a brief summary of their limitations or disadvantages in terms of location-independent packet routing and secure access, will now be described.

In the Mobile IP environment, each device is assigned to a static, global IP address. The device is also assigned to a fixed Home Agent (HA) on its home network. When the device roams, the following steps occur: (1) the device locates a Foreign Agent (FA) host on the remote network and establishes communication with it, and provides the FA with the identity of the HA; (2) the FA initiates a handshake with the HA; (3) packets destined for the client are received by the HA, which then tunnels them to the FA, which then forwards them to the device; (4) packets generated by the client are intercepted by the FA, which then tunnels them to the HA, which then forwards them to the intended destination. However, optimizations have been made to Mobile IP to allow the FA to transmit packets directly to the intended destination instead of sending them via the HA.

Mobile IP has a number of disadvantages and limitations, however. The "IP-inside-IP" tunneling requires that additional header material is added to the packet, and it also requires the recalculation of at least a new IP header checksum (for the additional IP header material). These operations require extra memory accesses at the HA and/or FA. On some operating systems, the checksum calculation may not be incremental (and therefore may require accessing every byte in the IP header). On some operating systems, adding header material requires that the entire packet be copied to a new buffer, requiring access to every byte in the packet. Packet tunneling between the HA and FA also increases the packet size. This in turn increases bandwidth consumption and may require additional fragmentation and re-assembly of the original IP packets (essentially introducing new packet loss conditions). Tunneling can therefore cause performance degradation. Furthermore, the tunneling between the HA and FA introduces a routing inefficiency, since all inbound packets must be routed between the two hosts, even when the packet source and destination are physically located on nearby networks.

Mobile IP also places burdens and restrictions on the client device. The client must install additional software to enable discovering the FA. A particular client is limited to communicating with only one FA at a time. This means that there is no provision for dividing the load among multiple FAs. If the FA fails, then all state information about the client is lost, and the client must re-establish all of its network connectivity. Furthermore, all clients must be assigned to a publicly routable (global) IP address. In today's Internet, such addresses are severely limited, so this represents a difficult limitation, particularly for large organizations with many mobile workers.

An end-to-end TCP re-mapping solution proposed by Alex Snoeren and Hari Balakrishnan is detailed in their paper, "An End-to-End Approach to Host Mobility," Proceedings of MobiCom 2000, August 2000. Recognizing the limitations of Mobile IP, these authors suggest that seamless mobility can be achieved by adding additional mechanisms to TCP, allowing an established connection to be "re-mapped" to a client's new IP address. In this way, as the client roams, it is free to obtain a new IP address and consequently re-map all of its open connections. In this solution, the TCP/IP connection operates directly between the roaming device (with its dynamic IP address) and the server. Whenever the device roams and obtains a new IP address, messages are sent over the TCP/IP link to notify the server that the device's address has changed.

This solution also has a number of drawbacks. It requires changes to the TCP implementations on all clients and servers, which is an unlikely occurrence. Applications that are aware of the device's IP address must be modified to learn about and handle the IP address changes that occur as the device roams. The solution does not work for User Datagram Protocol (UDP)/IP-based communication. Finally, the system relies on Dynamic Domain Name Service (DDNS) to allow remote hosts to learn about the client's current IP address; unfortunately, DDNS is not yet fully deployed.

The HAWAII system is described in an Internet Draft titled "IP micro-mobility support using HAWAII", R. Ramjee et al., Jul. 7, 2000, which is available on the Internet at http://www.ietf.org. HAWAII is an optimization to Mobile IP to enable a user to roam more effectively within a single administrative domain. When a user roams into an administrative domain, a relationship is established with the local FA, in the normal fashion. Within the administrative domain, roaming is accomplished by dynamically updating routers and host routing tables so that the FA can forward packets to and from the device.

This solution reduces the FA-HA setup and teardown overhead as compared to Mobile IP, because the FA does not change frequently: It remains fixed as long as the user is roaming within the administrative domain supported by the FA. Like Mobile IP, the HAWAII technique can eliminate outbound "triangle" routing for packets sent from the client (though not for packets sent to the client, because the client's public address is routed to the HA through the Internet).

However, the HAWAII technique introduces additional overhead to update routers (which may not be possible or permissible in many administrative domains). It also does not eliminate the computational performance, bandwidth, and reliability problems associated with Mobile IP.

These existing solutions for host mobility are also severely limited in that they do not provide mechanisms for enforcing policies regarding (1) which users are accessing the wired network through the wireless access environment and (2) which servers those users are communicating with.

Existing security mechanisms fall into two broad categories. The first is link-level encryption, and the second is secure IP tunneling. Each of these techniques will now be described.

Link-level encryption is used to ensure that data is not transmitted in the clear over the wireless network. In the 802.11 environment, WEP (Wireless Equivalent Privacy) is defined to enable encryption between the client and the wireless access point. In typical implementations, a systems administrator defines a key that is provided to all authorized users. Users configure their clients with this key, which is then presented to the access point to prove that the device is authorized to access the network. Once this handshake is complete, a session key is established so that subsequent traffic between the client and access point is encrypted; this encryption is implemented within the hardware in the wireless cards. A similar mechanism exists in Bluetooth environments.

This link-level security technique has several limitations. First, it is anonymous. That is, the access point (and the network) cannot determine which user is actually using the network. There is, therefore, no way to enforce user-based filtering and routing policies. In addition, this technique is cumbersome. WEP keys may be 1024 bits in length, and it is error-prone for users to be asked to type this information. Furthermore, there is no mechanism for key revocation. Once a user has been provided with the key, the user can no longer be denied network access. To prevent a previously-authorized user from gaining access to the network, the administrator must create a new key, re-program all of the access points, and notify all currently-authorized users to update their WEP keys. In a large installation, this is impractical.

An alternative to using this link-level technique involves constructing a secure IP tunnel between the wireless client and some router coupled to the access point. A solution of this genre has been announced by 3Com Corporation (see http://www.3com.com/news/releases/pr00/jul0500a.html). In this particular solution, the user provides a user name and password to the router, which authenticates the user. Subsequently, an MPPE (Microsoft Point-to-Point Encryption) link is established between the client and the router. In this way, the user is able to ensure that all packets are encrypted over the wireless network.

This technique, however, is unable to take advantage of the hardware encryption capabilities provided in the wireless access hardware, because the encryption function resides above the link level. In addition, the network administrator cannot use this mechanism to enforce access control or filtering policies on the network. Though such filtering could be integrated into the router itself, there is no mechanism to ensure that all clients establish secure tunnels with the router. It is possible to implement a filtering solution by directly wiring the router to every wireless access point (so that the router can therefore intercept all inbound and outbound traffic). However, this latter approach imposes a significant wiring burden and is therefore impractical.

Accordingly, what is needed is a technique for supporting host mobility that overcomes the limitations of prior art techniques.

SUMMARY OF THE INVENTION

The present invention is directed to methods, systems, and computer program instructions for supporting host mobility in short-range wireless computing networks. The disclosed routing techniques provide for maximum performance and throughput of the underlying routing infrastructure, minimize network latency for packets, and provide maximal configuration flexibility. Furthermore, the disclosed secure access techniques enable providing a secure, managed network environment in which per-user access controls and traffic filtering policies can be easily and efficiently enforced. Using these techniques, a client device can travel seamlessly through a wireless network (such as an in-building network) using a constant device address.

According to the present invention, each network connection is associated with a Home Agent Masquerader (HAM). The roaming device communicates through a Foreign Agent Masquerader (FAM) which, in turn, communicates with the HAM for each active connection. By enabling a client device to use different HAMs for each of its active connections, the HAM for a roaming device can be placed very close to the physical location where the client was at the time the connection was established. If the connection is short-lived and the user does not actually roam while the connection is in progress, no obscure routing paths of the type required in the prior art need to be constructed: the device simply uses the (nearby) HAM. In actual practice, most connections tend to be short-lived (e.g. to make requests from the Internet), so the disclosed technique is particularly advantageous. For situations in which connections are long-lived (or are expected to be long-lived), a technique is defined for placing the HAM function at a more centralized location.

Connection state is loaded into each FAM incrementally, as the FAM learns of new devices for which it needs to provide packet routing, thereby further improving overall system performance.

An efficient and incremental handoff processing technique is defined. The resulting system is highly scalable, and achieves high performance.

To complement these routing techniques, disclosed are security mechanisms for ensuring user-centric link-level security in short-range wireless networking environments. The disclosed mechanisms allow policy-driven packet filtering to occur while supporting user-based authentication, and while taking advantage of the existing encryption facilities provided by the device hardware at each endpoint.

BRIEF DESCRIPTION OF THE DRAWINGS

FIG. 1 illustrates the format of a Network Address Translation (NAT) table, as used in the prior art;

FIGS. 4 and 5 illustrate the format of a Foreign Address Masquerader table and a Home Address Masquerader table, respectively, according to a preferred embodiment of the present invention;

FIG. 14 depicts a secure managed environment and a filtering technique that may be used to provide user authentication, according to a preferred embodiment of the present invention; and FIG. 15 provides a flowchart that depicts the logic with which a secure link may be established, according to a preferred embodiment of the present invention.

DETAILED DESCRIPTION OF PREFERRED EMBODIMENT

The present invention will now be described more fully hereinafter with reference to the accompanying drawings, in which a preferred embodiment of the invention is shown. Like numbers refer to like elements throughout.

The present invention is described below with reference to flowchart illustrations of methods, apparatus (systems), and computer program instructions embodied on one or more computer readable media according to an embodiment of the invention. As will be obvious to one of ordinary skill in the art, these flowcharts are merely illustrative of the manner in which a preferred embodiment of the present invention may be implemented, and changes may be made to the logic that is illustrated therein (for example, by altering the order of operations shown in some cases, by combining operations, etc.) without deviating from the inventive concepts disclosed herein.

The present invention builds upon the use of Network Address Translation (NAT), which is well-known by those skilled in the art. Using NAT allows a particular client's network address to be "masqueraded" with some other address. This capability has traditionally been used to enable multiple private client addresses within a corporate network to be exposed to the Internet using a smaller number of publicly visible addresses. This reduces the number of global IP addresses that need to be obtained, and it enhances network security.

To accomplish this masquerading, a device providing NAT maintains an address translation table, with one entry for each established connection, as shown in FIG. 1. When a connection is established (e.g. a TCP SYN message is sent), the NAT host establishes an entry in the table corresponding to the client and server host addresses and ports. It also assigns a masquerading IP address and port, which are the "public" view of the client host for the lifespan of the connection. (Thus, for a particular client communicating with a first server, a first masquerading address and port may be used, while for this same client communicating with a different server, a different masquerading address and port may be used.)

Figure 2:
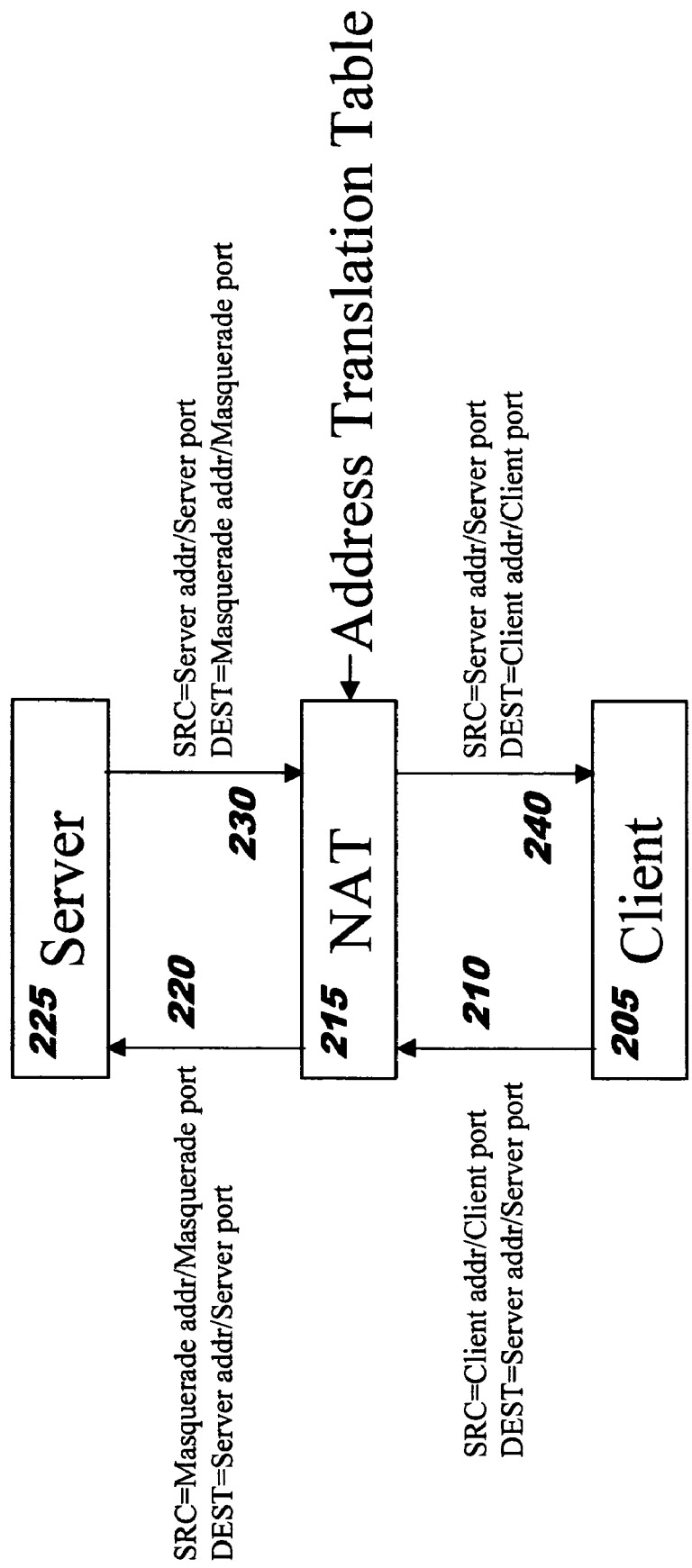
FIG. 2 depicts the translation technique used by prior art NAT systems.

The operation of the NAT is shown in FIG. 2. Any outbound packets sent 210 from a client 205 on a particular connection (using a source IP address set to the client's address and port number, and a destination IP address set to the server's address and port number) are forwarded 220 from the NAT 215 as if they were sent by the masquerade address and masquerade port number. Server 225 therefore believes it is communicating with a client having this masquerade address and port number. Thus, any inbound packets 230 from server 225 that are destined for the masquerade address and masquerade port are forwarded 240 by the NAT 215 as if they are destined to the actual client address and client port of client 205.

Figure 3:
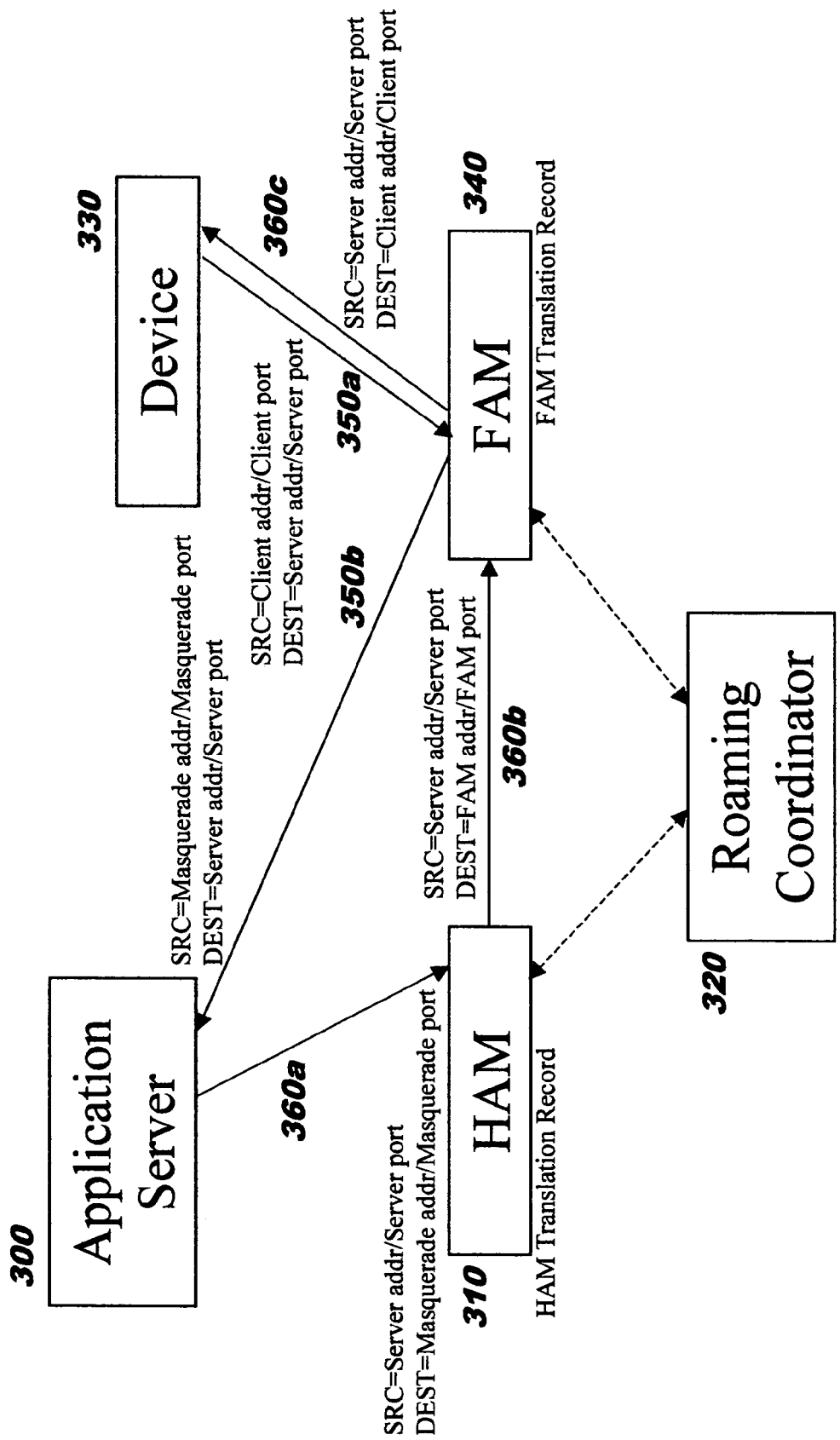
FIG. 3 depicts the logical components in a system according to a preferred embodiment of the present invention.

Reference is now made to FIG. 3, which shows the logical components of the system described in the present invention: (1) devices 330, (2) Home Address Masquerader (HAM) 310, (3) Foreign Address Masquerader (FAM) 340, (4) roaming coordinator 320, and (5) application server 300. Each of these components will now be described, as it pertains to the present invention.

Devices 330 used with the present invention (such as laptop computers, handheld computers, PDAs, cellular phones, etc.) are each equipped with a communications capability (preferably, a short-range wireless communications capability). The communications capability may include technologies such as 802.11, Bluetooth, HomeRF, or similar technologies (which may be as yet undeveloped). The network capability may be built into the device. Or, it may be made available in another manner, including but not limited to: via a plug-in card (such as a PCMCIA, or Personal Computer Memory Card International Association, card), or by attaching a dongle (that is, a plug-in device that attaches to a USB, or Universal Serial Bus, port or to an RS232 port).

All packets sent to and from a client device 330 pass through a FAM 340. The device's outbound packets 350*a* are forwarded 350*b* by the FAM to the destination server 300. Inbound packets from server 300, on the other hand, are first sent 360*a* to the device's HAM 310, and are then forwarded 360*b* to the FAM 340, which sends them 360*c* to the device 330.

In the preferred embodiment, a HAM 310 is statically assigned to each connection between a particular client device and server (although a device's HAM may be changed, as described in more detail below). To support routing, the HAM employs a HAM translation record (described below with reference to FIG. 5). In the preferred embodiment, the HAM is implemented within a network access point, router, or bridge, although as described below, it may alternatively be implemented within a central server or other host.

In the preferred embodiment, the FAM 340 is the first (non-bridging) network element that communicates with the device. Packets sent to and from the device must pass through the FAM. Preferably, the FAM is implemented within a network access point or a LAN router. (In alternative embodiments, FAM capabilities may be put in bridges, provided that every client communicates with a FAM-enabled bridge.) The FAM changes as the device roams. To support routing, the FAM employs a FAM translation record (described below with reference to FIG. 4). Preferably, the initial FAM also performs the role of HAM for the device, as described below, although this is not required by the present invention.

Application server 300 is the endpoint with which the device is communicating. This remains constant for the duration of the connection. (Alternatively, the application server itself may be a mobile device associated with its own FAM and HAM. This requires that static, publicly routable addresses are used as masquerading addresses for well-known services.)

Roaming coordinator 320 enables HAM and FAM connectivity and discovery, as well as connection migration (i.e. handoff). In the preferred embodiment, the roaming coordinator is implemented within a server computer that is network-connected to the various network access points in the system.

According to the present invention, the HAM and FAM enable location-independent packet routing using techniques that are based on the concepts of network address translation. To accomplish this, the HAM and FAM maintain a HAM translation record and FAM translation record, respectively, for each connection that they are supporting. The HAM translation records are collectively stored in a HAM translation table, and the FAM translation records are collectively stored in a FAM translation table, as will now be described.

The format of a FAM translation record used in a preferred embodiment of the present invention is shown in FIG. 4. A FAM translation table allows the FAM to rewrite outbound packets on a connection from a client as if they originated from a masquerading address and masquerading port that are assigned by the HAM. Upon receiving a packet from a client (see 350a of FIG. 3), the client (source) and server (destination) addresses and port numbers are used (preferably as an index) to retrieve a corresponding FAM translation record, and the masquerading address and port number stored therein are substituted for the client's actual address and port number (as described in more detail below with reference to FIG. 6). The FAM translation record also allows the FAM to forward inbound packets (see 360c) to the client address and port by retrieving the stored record having the matching FAM address and port number (and, therefore, the masquerading address and port number), and substituting the client as the destination in place of the FAM (as described in more detail below with reference to FIG. 7).

Figure 8:
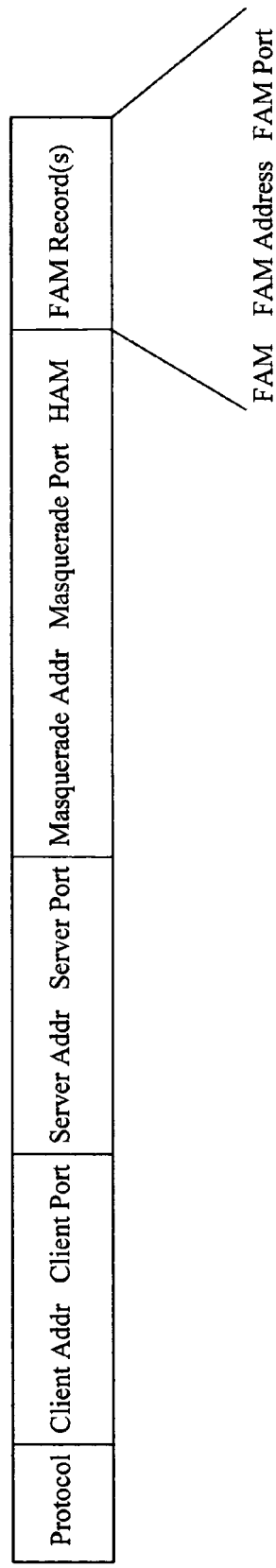
FIG. 8 illustrates the format of a connection table maintained by a routing coordinator (referred to equivalently herein as a roaming coordinator), according to a preferred embodiment of the present invention.

Note that while the example table formats shown in FIGS. 4, 5, and 8 include an entry for a protocol identifier, this information is optional and is required only in a system supporting multiple protocols (such as both TCP and UDP). It is also understood that the tables may contain more fields than are illustrated in FIGS. 4, 5, and 8, without taking away from the inventive concepts herein.

The format of a HAM translation record used in a preferred embodiment of the present invention is shown in FIG. 5. These HAM translation records allow the HAM to forward inbound packets to the appropriate FAM that can, in turn, forward the packets to the client. Upon receiving an inbound packet (see 360a) from a server, the HAM uses the masquerading address and port number, and retrieves a HAM translation record whose server address and port number match those contained in the packet. The FAM address and port stored therein are then substituted for the masquerading address and port, and the packet is forwarded (see 360b) to this FAM.

Though not shown in FIG. 5, alternative embodiments of the HAM translation record optionally may include (1) the actual client address and client port associated with the connection, which are known to the HAM when it assigns a masquerading address and port for the connection, and/or (2) multiple FAM addresses and FAM ports within each entry.

Multiple FAM addresses and ports may be present in two cases. First, when a client is roaming from one FAM to another, multiple FAMs may be temporarily associated with the connection. In addition, a client may be capable of communicating with multiple network access points or routers at once, even while stationary. It may therefore establish relationships with multiple access points, and send packets to and from the network through these access points. Therefore, multiple FAMs may exist for a particular connection, all of which are capable of forwarding a packet to the client. When more than one FAM is available for routing a particular packet, the HAM may select from the available FAMs using conflict resolution techniques (including selecting a FAM randomly) that do not form part of the present invention. (Preferably, the existence of multiple FAMs is also known from entries in the connection routing table, to be described below with reference to FIG. 8.)

Figure 6:
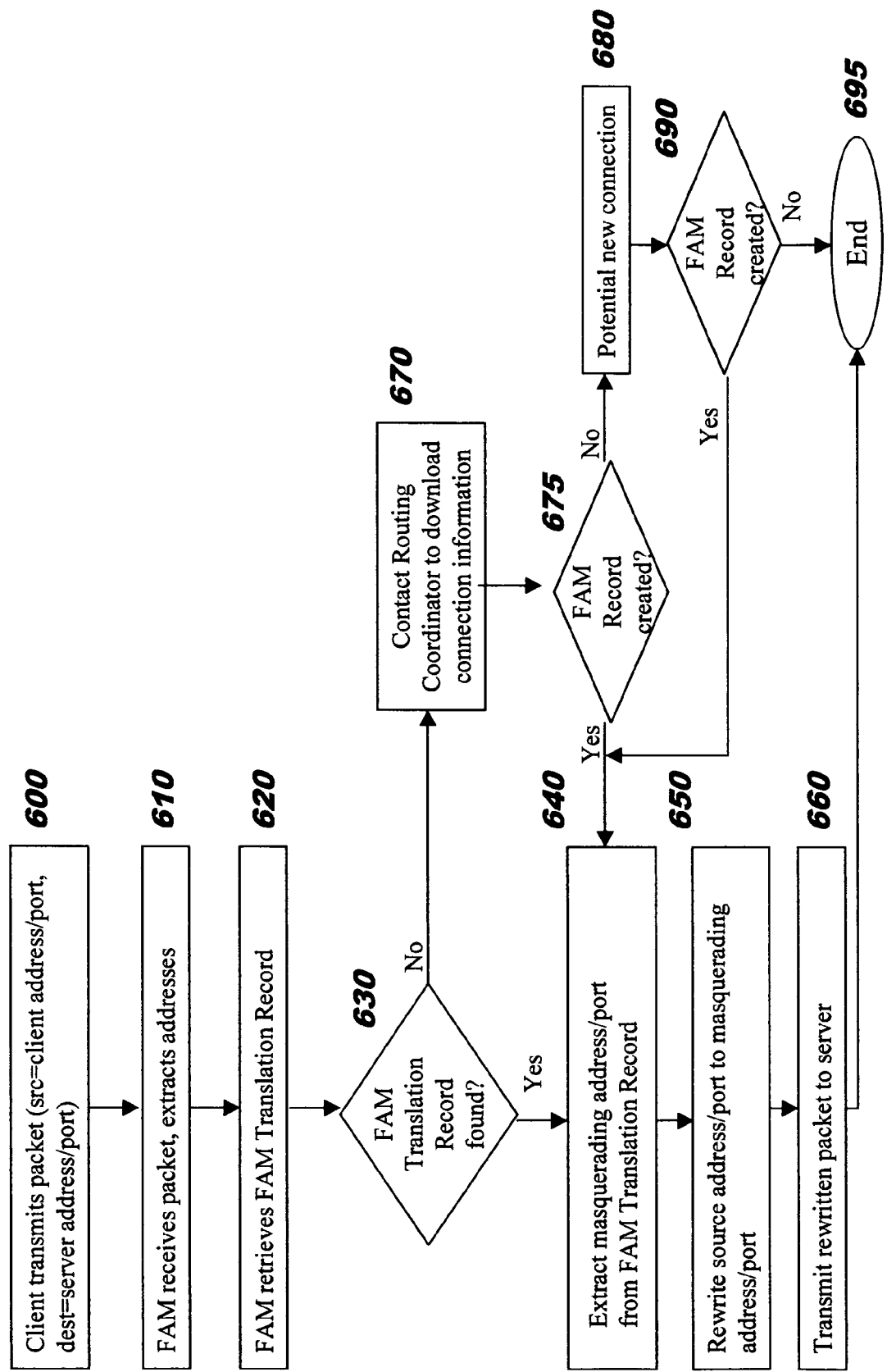
FIG. 6 provides a flowchart that depicts the logic with which packets transmitted by a client are delivered to a destination server, according to a preferred embodiment of the present invention.

FIG. 6 depicts a flowchart showing how a packet is transmitted from a client to a server according to a preferred embodiment of the present invention. This processing corresponds to flows 350a and 350b of FIG. 3. At Block 600, the client transmits an IP packet whose source is the client's IP address and port and whose destination is the server's IP address and port. This packet may be a packet in an already-established connection, or a connect request packet (such as a TCP SYN, or the first packet in a UDP stream). The packet is transmitted on a link that reaches the client's current FAM. (The FAM's MAC address is placed in the packet as the destination MAC address. This MAC address is known to the client using prior art techniques such as the Address Resolution Protocol, or "ARP". Alternatively, a broadcast MAC address may be used.) At Block 610, the FAM receives the packet and extracts the source address and port and the destination address and port from the packet. At Block 620, the FAM accesses the FAM translation table to retrieve a FAM translation record (see FIG. 4) whose client and server address and port match those of the extracted source and destination from Block 610.

At Block 630, it is determined whether a matching FAM translation record was found. If the answer to Block 630 is no, then at Block 670 the FAM contacts the routing coordinator to determine whether a connection between this client and this server already exists, and to establish a FAM translation record for it. (This process is detailed in FIG. 10.) At decision Block 675, it is determined whether the FAM translation record was created. If the answer to decision Block 675 is no, then this packet represents a (potential) new connection, which is handled (Block 680) in accordance with FIG. 9 (wherein the FAM will attempt to also become the HAM). The process continues at Block 690, where it is determined whether the FAM translation record was created. If the answer to decision Block 690 is no, then the packet is discarded, and the process terminates at Block 695. (In alternative embodiments, the check at decision Block 690 may be avoided, in which case the packet is always discarded, with the process directly terminating at Block 695. While this alternative discards the client's connect request packet, the protocol implementation in the client will typically detect this dropped packet and retransmit it. The retransmitted packet will be automatically processed in the proper manner by the logic as presented in the flowcharts.)

If the answer to decision Block 630 is yes (i.e. the FAM already knows about this connection), or if the answer to decision Block 675 is yes (i.e. this is a roaming device which is already known to the routing coordinator and which has just come into contact with this FAM), or if the answer to decision Block 690 is yes (i.e. this is a new connection for this device), then a valid FAM translation record has been located (or generated) for this packet. Control passes to Block 640, where the masquerading address and port are extracted from the FAM translation record. At Block 650, these addresses are inserted (i.e. substituted) as the source address and port in the packet, and at Block 660, the rewritten packet is transmitted on the network. The process terminates at Block 695.

In this way, packets transmitted by the client are forwarded to the server so that the server sees the source as being the masquerading address and port, instead of the actual client's address and port. Moreover, the address translation technique within the FAM of the present invention enables efficiently processing these outbound packets.

Figure 7:
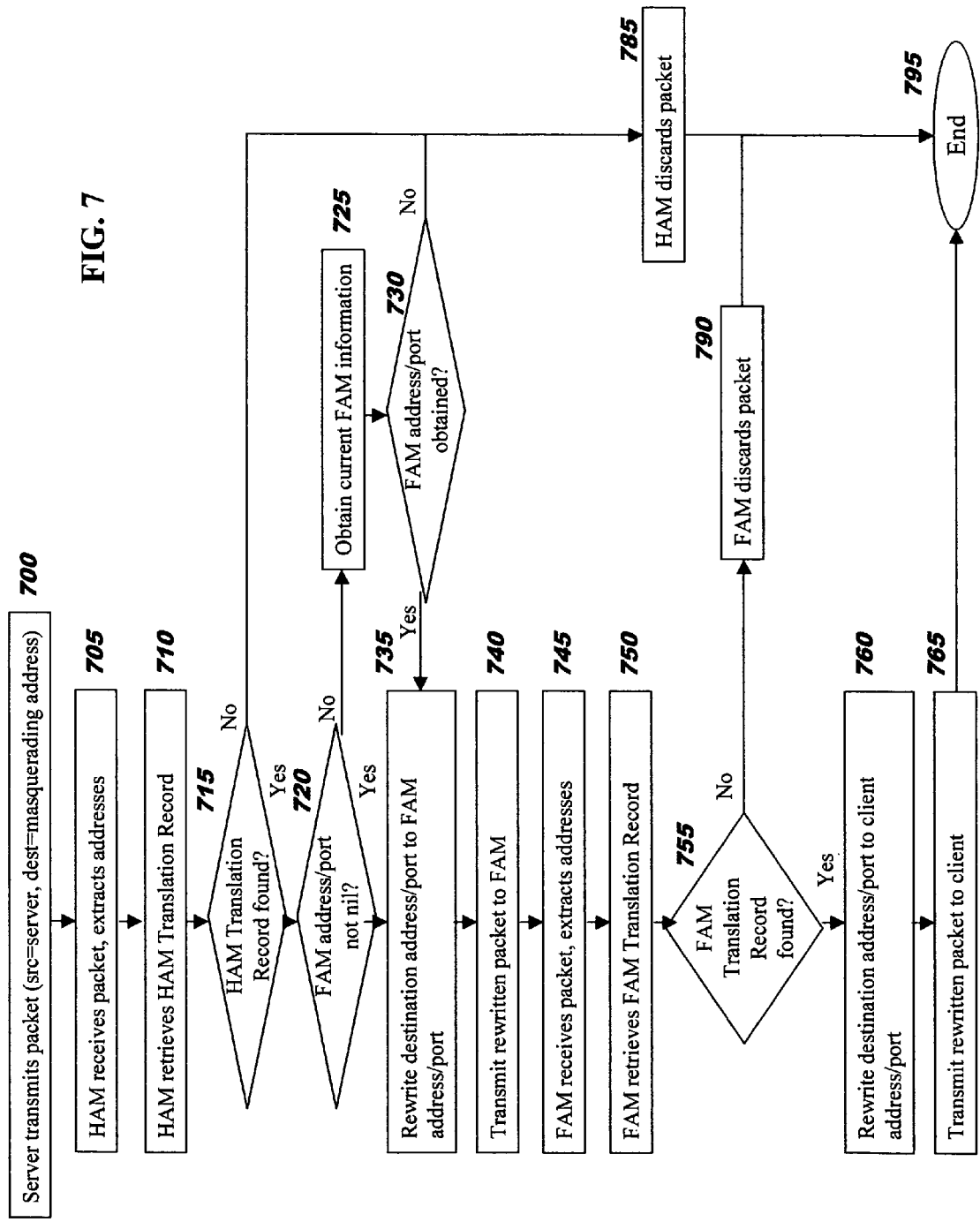
FIG. 7 provides a flowchart that depicts the logic with which packets transmitted by a server are delivered to a client, according to the preferred embodiment of the present invention.

Now referring to FIG. 7, there is shown a flowchart depicting how packets transmitted by the server are delivered to the client according to a preferred embodiment of the present invention. This corresponds to flows 360a, 360b, and 360c of FIG. 3. At Block 700, the server transmits an IP packet whose source address and port identify the server and whose destination address and port are the masquerading address and port associated with the connection. The server uses the masquerading address and port because all packets generated by the client were rewritten by the FAM (see FIG. 6) to use this address and port, and the server therefore believes this to be the address and port of the client with which it is communicating.

At Block 705, this packet is received by the HAM for the corresponding connection, and the HAM extracts the source (server) and destination (masquerading) addresses and ports from the packet. (As will be described below with reference to FIG. 9, the HAM is responsible for generating the masquerading address and port, so that packets sent to the masquerading address and port will arrive at the HAM through normal IP routing means.) At Block 710, the HAM searches the HAM translation table to locate a HAM translation record (see FIG. 5) matching the server address and port and masquerading address and port extracted from the packet. At decision Block 715, it is determined whether a HAM translation record was found. If the answer to decision Block 715 is no, then the HAM is not associated with a connection between the server and the client, so at Block 785, the packet is discarded. Processing then completes at Block 795.

Note that the flowcharts of the preferred embodiment are described as simply discarding packets in a number of error situations, which typically correspond to situations in which the client is actively moving and the tables have not yet been updated to reflect the client's new location. Upper layers of the protocol stack on the client will typically detect the discarded packets and provide remedial measures according to the prior art. An implementation may choose to also log information about these dropped packets. In particular, it may be desirable to log information when a transition is being made from Block 715 to Block 785, as this transition should not typically occur and may represent a denial-of-service attack. (Or, it may occur simply because the client has failed or left the domain without notifying its HAM or its most-recent FAM, or a timeout may have occurred that caused deletion of a UDP-based HAM translation record.)

Continuing with FIG. 7, if the answer to decision Block 715 is yes, then the HAM knows about this masquerading client, and at decision Block 720, it is determined whether the retrieved HAM translation record contains a non-nil FAM address and port. (The FAM information in the HAM translation record is nil when the HAM does not yet know which FAM is currently handling this masquerading client.) If the answer to decision Block 720 is no (i.e. there is no FAM assigned), then at Block 725, the FAM address and port are obtained from the routing coordinator in accordance with the algorithm shown in FIG. 12. (The FAM address and port are initially provided by the FAM to the routing coordinator according to FIG. 10; see Blocks 1010–1050.) At decision Block 730, it is determined whether a FAM address and port were obtained through this process. If the answer to decision Block 730 is no, then the client is not currently associated with any FAM. Control passes to Block 785, where the packet is discarded, and the process completes at Block 795.

In alternative embodiments, the HAM may choose not to perform a query to the routing coordinator, as depicted in Block 725, if it has performed a similar query on the same connection within a recent time period (where the time period may be a statically configured value or may be dynamically determined based on how long the connection has been without an associated FAM); in this case, the HAM proceeds to block 730 and behaves as if it did not receive a response from the routing coordinator. This alternative embodiment reduces the load on the HAM and the routing coordinator when frequent traffic is arriving on a connection for a client that is currently out-of-coverage.

Still referring to FIG. 7, if the answer to decision Block 720 is yes (i.e. there is a non-nil FAM entry in the HAM translation record) or the answer to decision Block 730 is yes (i.e. the FAM information was obtained from the routing coordinator), then the HAM has located a valid HAM translation record and a non-nil FAM address and port. (When the FAM is identified through the routing coordinator at Block 725, the processing of FIG. 12 revises the HAM translation record to remember this FAM information for subsequent use. See Block 1250.) At Block 735, the HAM rewrites the destination address to be the FAM address and port found in the HAM translation record. At Block 740, the rewritten packet is transmitted on the network, now destined for the FAM. At Block 745, the FAM receives the packet and extracts the server (source) address and port and FAM (destination) address and port from the packet. At Block 750, the FAM searches its FAM translation table to locate a FAM translation record matching the server address and port and FAM address and port that were extracted in Block 745. At decision Block 755, it is determined whether a matching FAM translation record was found. If the answer to decision Block 755 is no, then the client is no longer associated with this FAM, and the packet is therefore discarded (Block 790), and the processing completes at Block 795.

Continuing with FIG. 7, if the answer to decision Block 755 is yes, then this client is still using this FAM, and at Block 760 the FAM rewrites the packet's destination address to be the client address and port found in the FAM translation record. At Block 765, the rewritten packet is transmitted on the outbound link that is bound to the client destination. The process then completes at Block 795.

In this way, the server directs traffic to the masquerading address, and the HAM and FAM cooperate to route the packet to the client at its current location. If the client has moved such that it is now handled by a FAM different from that used previously for this connection, the new FAM is automatically and efficiently located by the HAM (in cooperation with the routing coordinator). Moreover, by applying NAT techniques, the performance of the HAM and FAM is maximized, and additional packet loss, fragmentation, and error conditions introduced by prior art mobile host solutions are eliminated.

When a connection is established (e.g. the first packet on a TCP connection or UDP stream is sent between a client and a server), a setup process is performed whereby the HAM is assigned and an initial FAM is designated. (As used herein, a UDP "connection" is defined as a sequence of UDP packets transmitted between a client address and port and a server address and port; because UDP is connectionless, the connection is implicit—according to the preferred embodiment, it ends when no traffic has been sent on the connection within some timeout period.) As a user roams about the network, the connection may need to be associated with different FAMs located near the user. This roaming requires that the FAM be designated, that the FAM learns about the masquerading address and port for the connection (in order to provide NAT services as described above with reference to FIG. 6), that the FAM assign an address and port for the connection, and that the HAM be notified about the FAM's address and assigned port for the connection. These exchanges, which establish and maintain the content of the HAM and FAM translation records, are coordinated through a routing coordinator. The functions involved in connection setup and roaming will now be described with reference to FIGS. 8 through 13.

The routing coordinator maintains a connection table, which holds one connection table record for each active TCP or UDP connection. FIG. 8 illustrates an example of the format of a connection table record, according to a preferred embodiment of the present invention. The connection table record holds the client and server address and port, the masquerading address and port, and the identity (e.g. network address) of the HAM. In addition, each connection table record includes zero or more FAM records, each containing the FAM identity (e.g. network address) and address and port assigned to the connection by the FAM. The connection table record may include multiple FAM records, one for each of the FAMs that the client is currently using to transmit packets on this connection. (Refer to the previous discussion of situations in which more than one FAM may be provided for a particular connection.)

Figure 9:
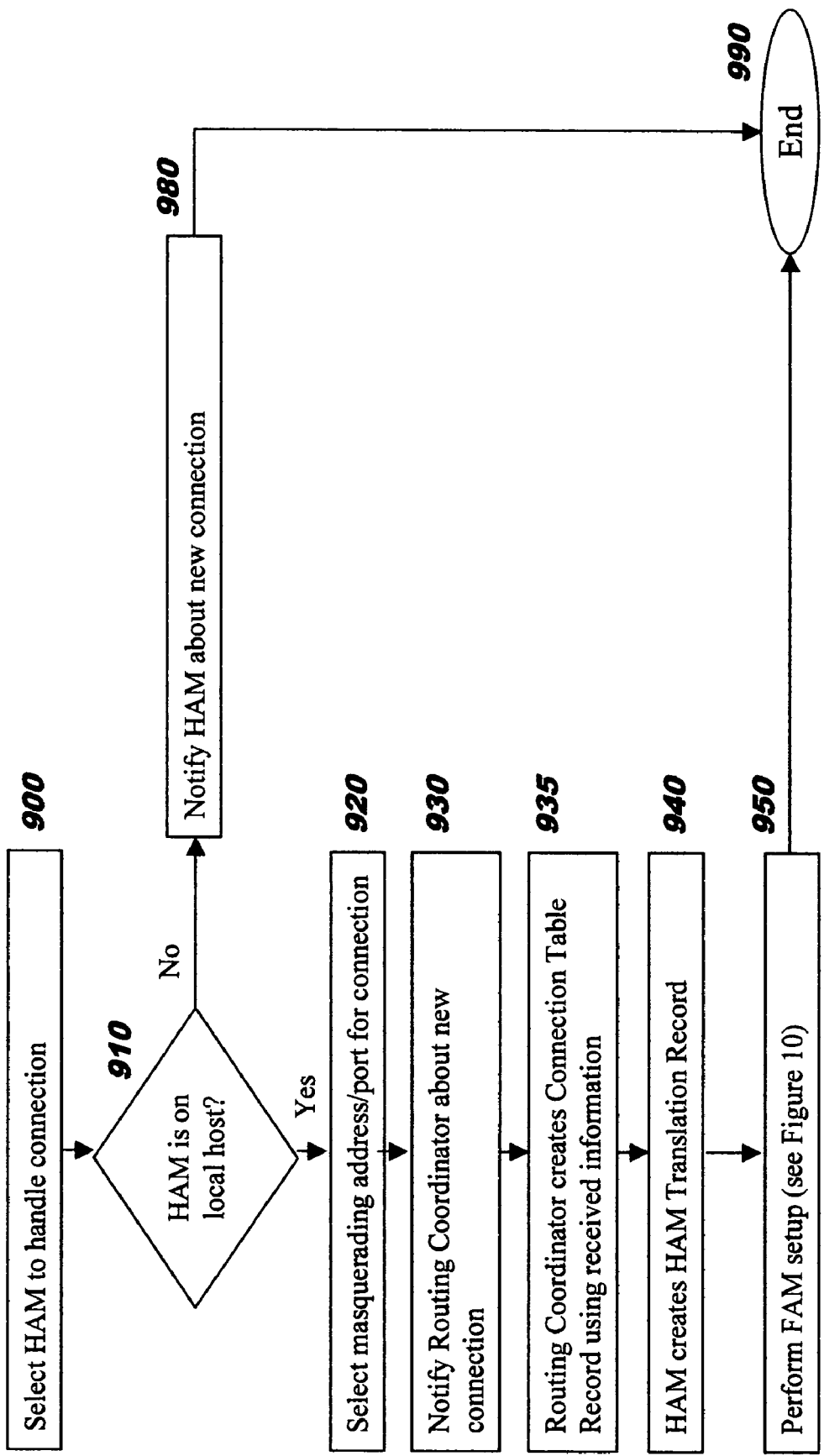
FIG. 9 provides a flowchart that depicts the logic that handles establishment of a new connection, according to a preferred embodiment of the present invention.

FIG. 9 provides a flowchart depicting how a connection is established when a packet is first transmitted by a client to a server, according to a preferred embodiment of the present invention. (As shown in FIG. 6, this processing occurs when the FAM has received a packet sent by a client, but the FAM cannot locate a FAM translation record either in its own FAM translation table or by contacting the routing coordinator.) Block 900 determines which host will serve as the HAM for this new connection. In the preferred embodiment, this role is played by the host that first receives and processes the outbound packet (i.e. the FAM). However, in alternative embodiments, it may be desired that the HAM role be played by the routing coordinator or some other fixed host. Or, another host may be selected, perhaps using dynamic factors (e.g. a host that is possibly located closer to the user's usual location, in the user's office, or within the user's own administrative domain) where the values of such dynamic factors are located using prior art techniques. (For example, a MAC address may be associated with a user in a stored table, or a user may be identified from information transmitted during an authentication or link establishment process. The user's identification may then be used to consult a configuration or preferences table, which may contain entries that can be used in the dynamic selection process.) This decision to designate a HAM other than the FAM that first receives the connection might occur according to an administrative policy, for example to reduce CPU or network load on the access points. Alternatively, it may be expedient to move long-lived connections to a central server to mitigate the risk of state loss were an access point to fail or be switched off. This HAM assignment policy may be made based on the network port that the connection is using; for example, connections to the TELNET port (port 23) might be automatically passed to the routing coordinator.

At decision Block 910, it is determined whether the designated HAM host is the local host. If the answer to decision Block 910 is no, then at Block 980, the designated HAM host is notified of the client and server addresses and ports for the connection; that HAM host, upon receiving this notification, executes the algorithm of FIG. 9. After notifying the HAM host, processing terminates at Block 990. This re-directing HAM will now become a FAM for the client, and will subsequently learn the masquerading information for the client from the routing coordinator in the usual way (according to the algorithm of FIG. 10).

Note that the subsequent invocation of FIG. 9 by the re-directed host also allows selection of a different HAM host. It must be ensured that the selection policy in an implementation will terminate without encountering an infinite loop. (Because the handoff policy of the present invention is globally administered, an infinite loop should not occur.)

If the answer to decision Block 910 is yes, then processing continues at Block 920, where the local HAM host selects a masquerading address and port for the connection between the client and server. The masquerading address must be an address that will route packets to this local HAM host, according to existing IP routing techniques of the prior art. The port must not be shared by any other active connection. (In the preferred embodiment, the port is not reused by a new connection until some duration has elapsed since the termination of a prior connection. This eliminates the possibility that stale packets from the previous connection may accidentally get routed onto the new connection.) Preferably, the masquerading address is the public address of the HAM itself, such that the uniqueness must be provided through selection of a unique port number. Alternatively, a HAM may have multiple public addresses, and may assign port numbers from all of them. This alternative approach provides additional scalability (because a larger range of address and port combinations is available for assignment, more connections can be supported). In addition, if the HAM is a multi-processing host, use of multiple masquerading addresses enables assigning different processors to each address.

At Block 930, the HAM notifies the routing coordinator about the new connection (providing the client address and port, the server address and port, masquerading address and port, and HAM identity). At Block 935, upon receiving this notification, the routing coordinator establishes a connection table record for the connection (where this record initially has no FAM records within it). At Block 940, the HAM creates a HAM translation record for the connection and inserts the record into the local HAM translation table. (As noted earlier, the HAM translation table records of the preferred embodiment do not include the originating client's address and port, although in alternative embodiments this information may also be stored.) The FAM address and port are set to nil in this newly-created record. Control then passes to Block 950, where the local HAM host establishes itself as a FAM for the connection (according to the logic of FIG. 10). The process then terminates at Block 990.

Figure 10:
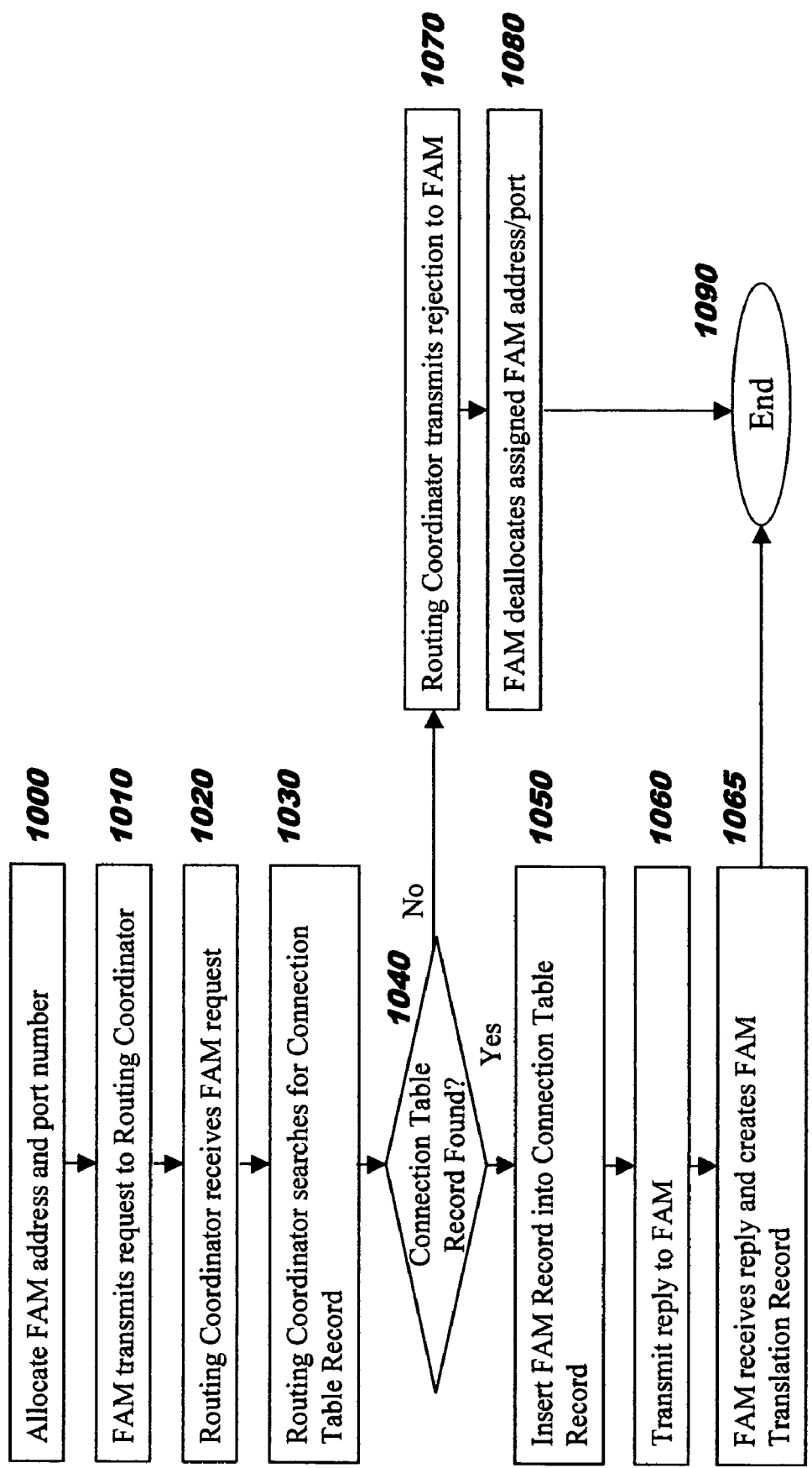
FIG. 10 provides a flowchart that depicts the logic invoked when a packet arrives for a device that may be roaming on an existing connection or that may be establishing a new connection, according to a preferred embodiment of the present invention.

Referring now to FIG. 10, there is shown a flowchart depicting a preferred embodiment of the steps taken when an access point (or router or bridge) first receives packets from a client on a connection for which no FAM translation record exists. This situation may arise, for example, when the client is roaming and is transmitting packets on an already-established connection that used a different FAM. As shown in FIG. 6, the FAM must receive information about the masquerading address and port in order to create a FAM translation record and then use it to forward the packet. Because the connection is already established, a HAM has already been assigned, along with a masquerading address and port. This situation also arises for a new connection (in which case FIG. 10 is invoked from FIG. 9), in order to set the initial FAM.

At Block 1000, the FAM allocates a FAM address and port number for this connection between the client and server. The allocated address must be network routable to the FAM host from any potential HAM. The FAM address and port combination must not be already allocated to some other connection for which the FAM host is serving as FAM or HAM. Preferably, the FAM address is the address of the FAM itself, such that the uniqueness must be provided through selection of a unique port number. Alternatively, a FAM may have multiple addresses, and may assign port numbers from all of them. This alternative approach provides additional scalability (because a larger range of address and port combinations is available for assignment, more connections can be supported). In addition, if the FAM is a multi-processing host, use of multiple FAM addresses enables assigning different processors to each address.

The generated FAM address and port combination are communicated to the routing coordinator (and subsequently to the HAM—see FIG. 7). Because the FAM address and port are unique to the connection, the FAM can use that combination to uniquely identify the correct FAM translation record to be applied to packets destined for the client— and hence which client address and port to use. In the preferred embodiment, both the server address and port, and the FAM address and port, are checked when the FAM accesses its FAM translation records, to ensure that spurious packets are not forwarded to the client (although the client would typically simply discard such packets, if received). However, if it is known that the FAM address is constant, an alternative embodiment may omit storing and/or comparing the FAM address within its own FAM translation table.

At Block 1010, the FAM transmits a request to the routing coordinator to become the current FAM. This request includes the client address and port, the server address and port, the FAM identity, and the FAM address and port. (The client address and port and server address and port were extracted by the FAM in Block 610 of FIG. 6 from the packet transmitted by the client.) At Block 1020, the routing coordinator receives the FAM request and extracts its parameters. The routing coordinator then searches (Block 1030) the connection table for a connection table record whose client address and port and server address and port match those provided by the FAM for this connection. At decision Block 1040, it is determined whether a matching connection table record was found.

Continuing with FIG. 10, if the answer to decision Block 1040 is no, then (according to the present invention) this is not an existing connection between this client and server, and a notification is returned (Block 1070) to the FAM to indicate that the request is rejected. At Block 1080, the FAM deallocates the FAM address and port provided in its request, and the process terminates at Block 1090.

Still referring to FIG. 10, if the answer to decision Block 1040 is yes, then the routing coordinator adds a new FAM record to the connection table record (Block 1050). This FAM record includes the FAM identity and FAM address and port provided in the FAM request sent at Block 1010. If one or more FAM records are already present in the connection table record, the routing coordinator may insert this new FAM record in an order that is best suited to a particular system in which the present invention is implemented. For example, new FAM records may be entered in FIFO (First-In, First-Out) order, or in an order based on a policy such as a prediction of which FAM the client is most likely to use in the immediate future (where this information may be determined using historical analysis techniques that do not form part of the present invention).

At Block 1060, the Routing coordinator sends a reply to the FAM and provides the HAM identity (e.g. its network address) and the masquerading address and port associated with the connection. At Block 1065, the FAM receives the routing coordinator response and creates a FAM translation record containing the information provided by the routing coordinator. The process then terminates at Block 1090. The HAM will dynamically learn of this new FAM according to the logic of FIG. 7, upon receiving a packet destined for the client's masquerading address and port, and will automatically forward the packet to the appropriate FAM.

Note that although FIGS. 9 and 10 depict particular embodiments of the HAM assignment and FAM translation record creation processes, respectively, it is understood that alternative embodiments may implement these processes differently without deviating from the inventive concepts disclosed herein. For example, the process of FIG. 10 could be re-implemented as a two-phase request between the FAM and the routing coordinator. In the first request, the FAM queries the routing coordinator to determine whether the connection exists (i.e. whether a HAM has already informed the routing coordinator of the connection), and in the second request, the FAM provides a FAM address and port to assign to the connection. In this way, the FAM does not need to allocate a FAM address and port until it is sure that the connection table record exists (thereby eliminating the deallocation step of Block 1080).

Figure 11:
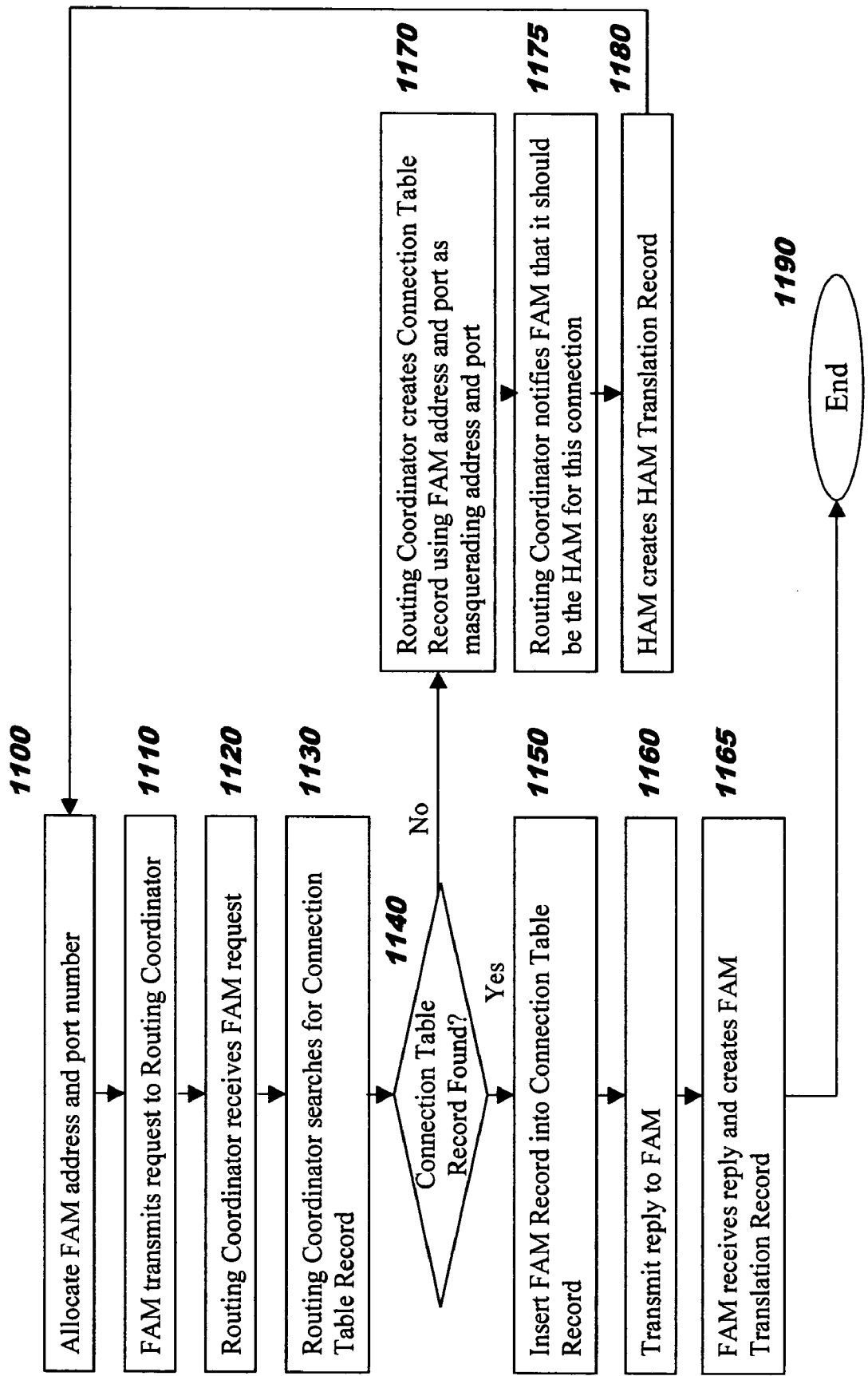
FIG. 11 provides a flowchart depicting logic that may be used as an alternative to that of FIG. 10.

As shown in FIG. 6 (Block 670), the process of FIG. 10 is first executed by a FAM to determine whether the connection already exists (and, if so, to establish a FAM translation record for it); if the connection does not already exist (i.e. the answer to the decision in Block 675 is no), the process of FIG. 9 is executed to establish a HAM (and create a new connection table record). An alternative embodiment may optimize the sequence when the process of FIG. 10 is executed immediately prior to the process of FIG. 9. For example, once it is determined that a connection table record does not exist for the FAM request (i.e. the answer to the decision in Block 1040 is no), then the routing coordinator can immediately begin processing the FAM request as a HAM establishment request; in this case, the requesting FAM becomes designated as the HAM for the connection. This alternative process is illustrated in FIG. 11. The sequence of Blocks 1100, 1110, 1120, 1130, 1140, 1150, 1160, 1165, and 1190 match the "normal" processing path of FIG. 10. However, at decision Block 1140 (corresponding to Block 1040), if the routing coordinator determines that no connection table record exists for the connection, control passes to Block 1170. The routing coordinator determines that because this is a new connection, the host that requested to become a FAM should, in fact, be designated as the HAM for this connection. The provided FAM address and port become the masquerading address and port for the connection, and a connection table record is created. At Block 1175, the requesting FAM is notified that it has become the designated HAM for the connection. At Block 1180, the requesting FAM (now the HAM) creates a HAM translation record for the connection. The process then returns from Block 1185 to Block 1100 in order to establish the local FAM translation record for the newly-registered connection.

In yet another alternative embodiment of the present invention, the process of FIG. 10 might be re-implemented as a direct communication between the FAM and the HAM. For this to occur, the routing coordinator must broadcast the identity of the HAM whenever a new connection table record is created (according to the process of FIG. 9). This solution reduces the processing load on the routing coordinator at the expense of additional network bandwidth consumption and additional load on the HAM.

Figure 12:
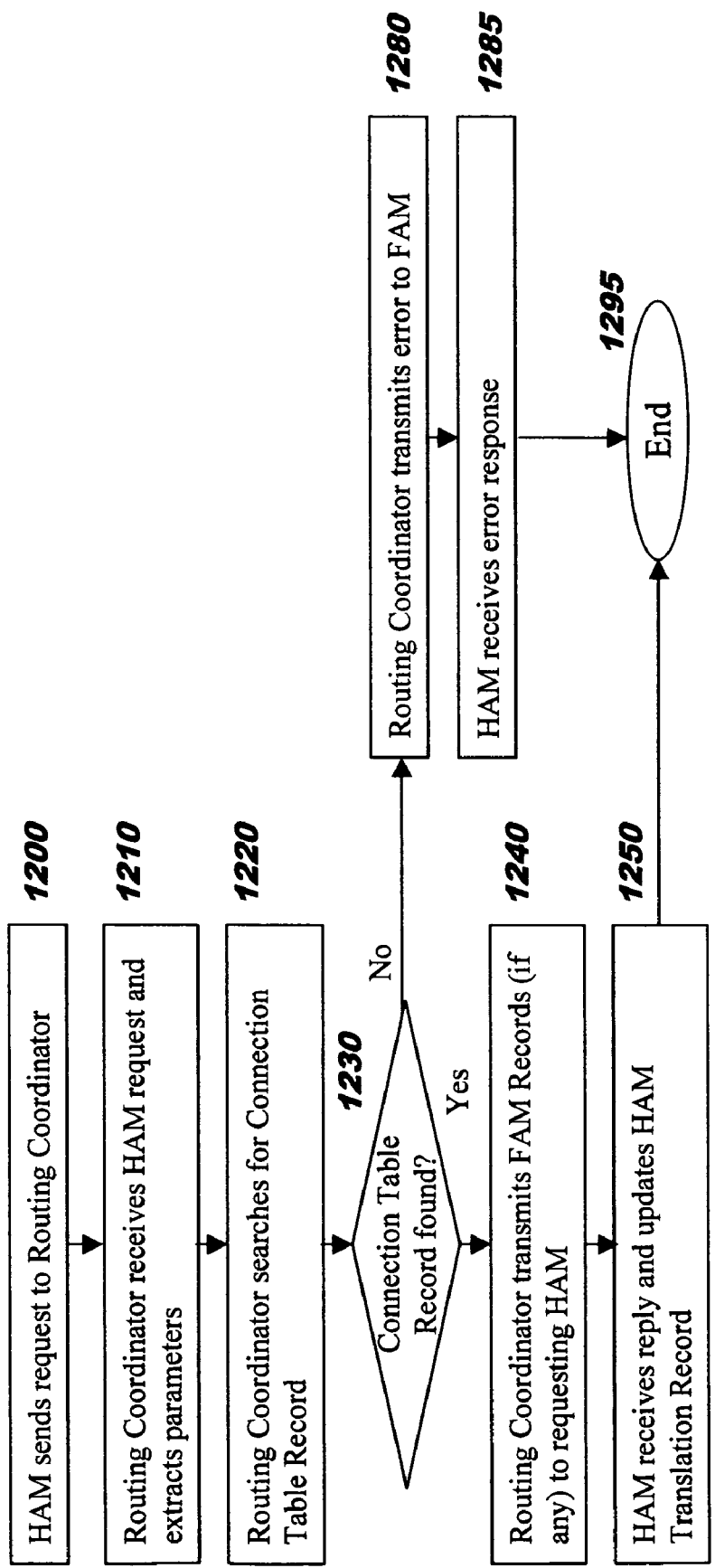
FIG. 12 provides a flowchart that depicts the logic with which the changing location of a client device is dynamically learned, according to a preferred embodiment of the present invention.

Referring now to FIG. 12, there is shown a flowchart depicting how the HAM retrieves information about the current FAM address and port that are associated with a connection. The HAM has received a packet from a server, and needs to know which the packet should be forwarded to. (This process is invoked from Block 725 of FIG. 7, when the HAM has a FAM translation record matching the server address and port number and the masquerading address and port number, but the FAM address and port within that record are set to nil values.) At Block 1200, the HAM issues a request to the routing coordinator. This request includes the masquerading address and port. (Alternatively, if the HAM translation record includes the client address and port, the HAM could first determine the client address and port for the inbound packet and provide that information and the server address and port instead of, or in addition to, the masquerading address and port.) At Block 1210, the routing coordinator receives the HAM request and extracts the parameters from the request. The routing coordinator then searches (Block 1220) the connection table for a connection table record whose masquerading address and port (and server address and port and client address and port, if this information is provided) match those provided by the HAM. (Preferably, the routing coordinator uses the masquerading address and port as a key to index its connection table, although the server and client information may also be used. Upon locating a matching record when only the masquerading information is used, the routing coordinator preferably verifies the server address and port against the extracted values. A mismatch indicates an error condition, such as a significantly-delayed packet, a replay attack, or a fraudulent packet.)

At decision Block 1230, it is determined whether a matching connection table record was found.

Still referring to FIG. 12, if the answer to decision Block 1230 is no, then an error has occurred, and at Block 1280, an error message is returned to the HAM. At Block 1285, the HAM receives the error response. The process completes at Block 1295. Though not shown in the figure, it is understood that the HAM may optionally perform various operations to handle this error. For example, it may delete the HAM translation record corresponding to the connection and re-establish itself as the HAM in accordance with the procedure in FIG. 9.

Continuing with FIG. 12, if the answer to decision Block 1230 is yes (i.e. the routing coordinator knows about this connection), then at Block 1240, the routing coordinator generates a response message to the HAM. This response message contains a list of the FAM records contained within the connection table record. At Block 1250, the HAM receives the respose message and updates the HAM translation record to reflect the received FAM address and port (if any). The process then terminates at Block 1295.

Preferably, when the routing coordinator finds more than one FAM record during the processing of Block 1220, all such entries are communicated to the HAM at Block 1240. The HAM may then use one or all of these (e.g. based on an implementation-specific policy) to update its HAM translation record. Alternatively, the routing coordinator may select some subset of the located FAM records, using a selection algorithm such as an implementation-specific policy, and transmit this subset at Block 1240. When using this alternative technique, the routing coordinator is able to selectively control which FAM(s) are exposed to the HAM.

In the preferred embodiment, the HAM learns about FAM address and port assignments on an "as-needed", incremental basis (i.e. by invoking the technique of FIG. 12 from Block 720 of FIG. 7). However, in alternative embodiments of the present invention, the routing coordinator may initiate (or "push") the transmission of the FAM information directly to the appropriate HAM. For example, upon the completion of the process shown in FIG. 10 (wherein a new FAM record is added to the connection table record at Block 1050, the connection table record having been initially created upon a notification from the HAM at Block 930 of FIG. 9), the routing coordinator might immediately notify the HAM about the new FAM. In other alternative embodiments of the present invention, the routing coordinator may buffer FAM updates and push multiple FAM updates in a single notification; this notification may be unicast, multicast, or broadcast. In yet other embodiments of the present invention, when the HAM requests FAM information for a particular connection, the routing coordinator may choose to provide, in the response, information about other relevant FAM updates that have occurred to other connections that the HAM is managing.

Figure 13:
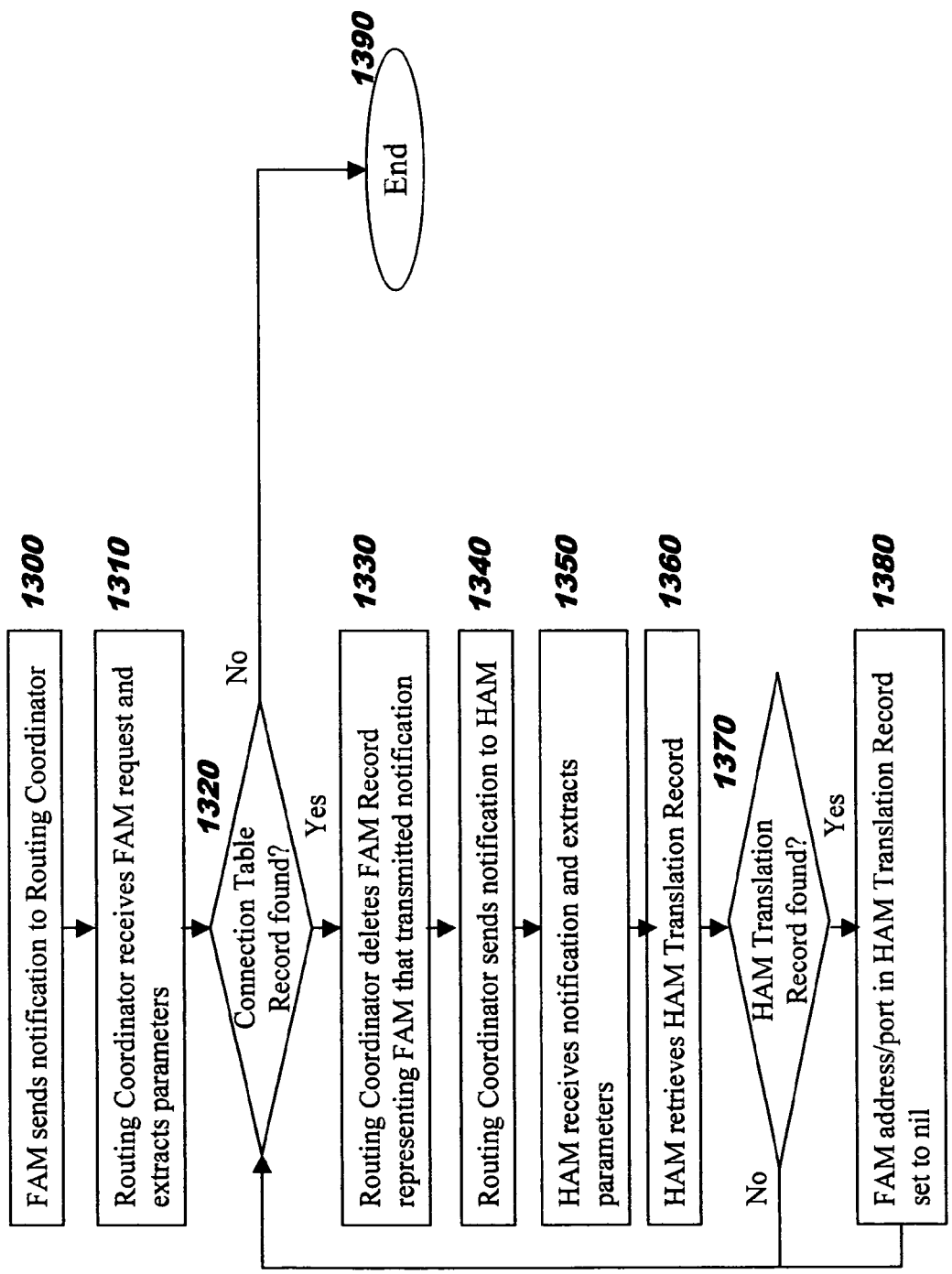
FIG. 13 provides a flowchart that depicts the logic used to prevent packets destined for a client from being sent to a routing device with which the client is no longer associated, according to a preferred embodiment of the present invention.

When a client is no longer in communication with a FAM, that FAM must ensure that no future packets will be routed to it by the HAM; otherwise, those packets will assuredly be lost (see Block 790 in FIG. 7). Referring now to FIG. 13, there is shown a flowchart that depicts a preferred embodiment of the steps taken when a client terminates its communication with the FAM. This connection termination may be explicit (for example, caused by some form of "termination", "shutdown", or "disconnect" message transmitted at the communication link level) or implicit (for example, caused by a timeout when no communication has occurred over the link for some period of time). At Block 1300, the FAM transmits a notification to the routing coordinator. This message contains the client address and FAM identity. At Block 1310, the routing coordinator receives the notification and extracts the contained parameters. At decision Block 1320, it is determined whether there are any connection table records whose client address matches the client address given in the FAM notification and which are associated with a FAM record whose FAM identifier matches the FAM identifier given in the FAM notification. If the answer to decision Block 1320 is no, then the routing coordinator will not use this FAM for requests to locate this client, and processing terminates at Block 1390.

Continuing with FIG. 13, if the answer to decision Block 1320 is yes, then at Block 1330, the routing coordinator deletes the FAM record (whose FAM identifier matches that in the FAM notification) from the connection table record. In Block 1340, the routing coordinator preferably transmits a notification to the HAM associated with the connection table record. This notification includes the masquerading address and port and FAM address and port. (In an alternative embodiment where the HAM translation record stored the client address and port, this notification may use the server address and port and the client address and port instead of, or in addition to, the masquerading information.) At Block 1350, the HAM receives this notification and extracts the parameters. The HAM then retrieves (Block 1360) a HAM translation record corresponding to the masquerading address and port (and the server address and port and the client address and port, if provided) provided in the notification. At decision Block 1370, it is determined whether the HAM found a matching HAM translation record that contains the provided FAM address and port. If the answer to decision Block 1370 is yes, then in Block 1380, the provided FAM address and port are removed from the retrieved HAM translation record (that is, the fields are set to nil). Control then returns to decision Block 1320. If the answer to decision Block 1370 is no, then no updates are needed to the HAM translation table, and control returns to Block 1320. (It is understood that in alternative embodiments, the HAM might take additional actions if no HAM translation records are found for the designated connection; for example, the HAM might request that the routing coordinator delete the corresponding connection table record from its connection table. Implementation of such optimizations will be obvious to one of ordinary skill in the art.)

In this way, when a client disconnects from a FAM, the routing coordinator ensures that no HAMs will continue to forward packets to that FAM on behalf of any open client connections.

Once a HAM has been assigned to a connection, that HAM continues to route inbound packets for that connection, regardless of which FAM the client is currently using to send outbound packets and to receive inbound packets. However, in certain situations, it may become necessary for the HAM role to be migrated to a different host (such as to a different access point or to the routing coordinator). For example, if the HAM fails or is removed, then another host must take responsibility for the connections previously being handled by the HAM; the transfer may also be appropriate when the nature of the connection changes so that it requires additional CPU or network bandwidth resources that can only be provided by an alternative HAM. To accomplish this transfer, the new HAM performs the following steps for each connection for which it is assuming the HAM responsibility.

First, the new HAM "takes over" the masquerading IP address, if it has not already done so. This IP address takeover ensures that packets transmitted to the masquerading IP address will be routed to the new HAM host. The IP address takeover process is well established in the prior art. (If the new HAM is on the same LAN as the old HAM, it simply requires transmission of a new ARP update so that the IP address is associated with the new HAM's LAN address; if the new HAM is on a different LAN, then routing tables must be updated.)

Second, it establishes a HAM translation record for the connection. This is done by obtaining the necessary information from the connection table record corresponding to the connection being transferred. The new HAM translation record must include FAM information, if a FAM record is associated with the connection table record. (The algorithms of FIGS. 9 and 10 may optionally be used to obtain the required information from the routing coordinator.)

Third and finally, it begins to operate as the new HAM for the connection by using the HAM translation record to determine how to forward packets to the current FAM.

Though the flowcharts in FIGS. 6–7 and 9–13 have been shown as a serial stream of operations, it is understood that in alternative embodiments, many of these steps may occur in parallel. For example, message transmissions may occur using asynchronous communication, thereby allowing the sender to continue processing immediately, without waiting for a response. This is particularly true when notifications are transmitted.

The present invention has been described thus far without any provision for identifying the particular user who is sending and receiving network traffic and without any provision for filtering the traffic generated to or from a particular client. Reference is now made to FIG. 14, which depicts a managed network environment that implements the present invention. A client authentication module 1405 is integrated into the client 1400, and a server authentication module 1425 is integrated into the access point 1420. When the client first communicates with the access point (and if no valid session key already exists between the two link endpoints), the client authentication module communicates 1415 with the server authentication module to provide the user's authentication credentials (e.g. user name and password). Once the user is authenticated 1445 (by means of an authentication server 1450, using techniques of the prior art), the server authentication module and the client authentication module negotiate a session key to enable link-level encryption. In the preferred embodiment, this key is provided to the client by the server authentication module or alternatively, by the authentication server; however, in alternative embodiments, the access point may deliver a master key (e.g. a WEP key) to the client, and the client and access point may subsequently negotiate a session key using the master key in the standard fashion. In this way, the client is authenticated according to a user name and password, and this authentication enables provision of link-level encryption that takes advantage of the encryption capabilities embedded in the client and access point hardware 1410, 1430.

Once the authentication takes place, the server authentication module provides 1455 the client's MAC address, session key, and user name to the routing coordinator 1460 over a secure channel, which stores them in a lookup table. This lookup table is used to provide the session key to any new access point with whom the client device begins communication, and it is used to enable the filtering module 1435 to identify the user for a particular client device and, subsequently, to determine the appropriate filtering policies to apply for that user.

Still referring to FIG. 14, a filtering module 1435 is included in the access point 1420 so that it receives all inbound and outbound traffic to and from the client 1400. When a packet with a heretofore unseen MAC address arrives at this filtering module, it issues a request 1465 to the routing coordinator to determine the user's identity and obtain a list of filtering policies for that user. These policies are then applied to appropriately block inbound and outbound traffic. Using this technique, the present invention enables simply and efficiently enforcing access control and packet filtering policies.

Referring now to FIG. 15, there is shown a flowchart depicting the steps taken to establish a secure, managed link in accordance with a preferred embodiment of the present invention. At Block 1500, it is determined that a client does not have a valid link-level key for communication with a particular access point. This determination may occur because the client does not have a key at present, or the access point may signal to the client that the current key is invalid. Before rejecting the key, the access point may optionally communicate with the routing coordinator to determine the currently valid session key for the client MAC address.

At Block 1510, the client authentication module is invoked to provide user credentials to the server authentication module. The server authentication module receives these credentials (Block 1520) and provides them to the authentication server. At Block 1530, the server authentication module receives a response from the authentication server. At decision Block 1540, it is determined whether the authentication server response was positive.

If the answer to decision Block 1540 is no, then at Block 1590, the server authentication module rejects the authentication and the process completes at Block 1595 without an established link key.

If the answer to decision Block 1540 is yes, then at Block 1550, the server authentication module accepts the authentication request from the client and transmits a positive response to the client authentication module. At Block 1560, a session key is negotiated between the client authentication module and the server authentication module (assuming a negotiation process for a key value is being performed). The process then splits into two parallel paths, one corresponding to activity at the client and the other corresponding to activity at the access point. At Block 1570a, the client authentication module provides the negotiated session key to the client encryption hardware, which, in turn, uses the key to encrypt and decrypt packets sent through the access point. The client-side process then terminates at Block 1595. At the access point, at Block 1570b, the server authentication module provides the negotiated session key to the server encryption hardware, which, in turn uses the key to encrypt and decrypt packets send to the client. At Block 1580b, the server authentication module provides the routing coordinator with the client MAC address, session key, and user name to be stored in the lookup table previously described with reference to flow 1455 of FIG. 14. The process then terminates at Block 1595.

In alternative embodiments of the present invention, the system may support multiple types of connections, such as those over TCP and (as described earlier) UDP. In this case, many of the transmissions described herein must also include a protocol identifier, and the table retrievals must take account for the protocol ID in addition to the addresses and ports. The manner in which the flowcharts may be altered to provide an implementation of this type of multi-protocol support will be obvious to those skilled in the art.

In alternative embodiments of the present invention, it is understood that implementations may choose to hash or otherwise encode the address and port combinations. This encoding reduces the memory size of the information, thereby reducing the size of the various tables and improving the performance of the retrieval processes. Such methods for hashing or encoding information are well known in the prior art, and their use within the context of the present invention will be obvious to one of ordinary skill in the art.

As has been demonstrated, the present invention provides a number of advantages over prior art host mobility solutions. With the present invention, no modification to the operating system, the networking software, nor the applications on a client device or server is required in order to provide location-independent packet routing and secure access. Packet routing for a roaming device is provided very efficiently through use of network address translation techniques, enabling client devices to use a single device address regardless of their current location. Indirect, or triangular, routing is avoided for short-lived and/or non-mobile connections. While some IP header information is rewritten in packets being routed, recalculation of IP checksums can be done easily and efficiently (e.g. by performing only a bit-wise comparison of the changed fields, as is known in the art). Load balancing may be facilitated, due to performing HAM assignment on a per-connection basis rather than globally as in the prior art. A HAM may be dynamically re-assigned, if desired, to further optimize performance. Failures of routing components are automatically detected and handled. Connection handoff is transparent to clients and servers. Both distributed and centralized implementations may be provided (by placing HAM functionality in access points or in a routing coordinator, respectively). User identity is explicitly determined, providing the ability to filter packets sent to and from the user. This user authentication preserves the use of existing encryption hardware on the client and access point to establish secure links.

The related invention defines a system comprising a collection of access points, wherein an IP address is assigned to a device via those access points and a core server; a technique for ensuring that the IP address stays constant, regardless of which access point a device is using at a point in time; a technique for keeping track of which access point a device is currently using; and a technique for exposing user location information to applications. An implementation of the present invention may optionally be combined with an implementation of the related invention, wherein the routing coordinator defined herein and the core server of the related invention are implemented as a single entity which assigns dynamic addresses, handles user location tracking, and so forth (in its core role) and routes packets to those devices (in its routing coordinator role).

The foregoing description of a preferred embodiment is for purposes of illustrating the present invention, and is not to be construed as limiting thereof. Although a preferred embodiment has been described, it will be obvious to those of skill in the art that many modifications to this preferred embodiment are possible without materially deviating from the novel teachings and advantages of this invention as disclosed herein. Accordingly, all such modifications are intended to be within the scope of the present invention, which is limited only by the claims hereafter presented (and their equivalents).

What is claimed is:

1. A method of enabling location-independent packet routing in a short-range wireless networking environment, comprising steps of:
   providing one or more portable client devices, each of the client devices identified by a constant client address and equipped with a short-range wireless communications capability for communicating in the short-range wireless networking environment;
   providing one or more application servers, each of the application servers equipped for communicating over the short-range wireless networking environment;
   transmitting a packet from a selected one of the application servers to a selected one of the client devices, wherein the transmitted packet is received at a home agent associated with the selected client device;
   forwarding, by the home agent, the received packet to a foreign agent through which the selected client device is currently communicating;
   receiving, by the foreign agent, the forwarded packet; and
   forwarding, by the foreign agent, the received forwarded packet to the selected client device.

2. The method according to claim 1, wherein a fixed host is chosen as the home agent associated with the selected client device.

3. The method according to claim 1, wherein an identification of the selected one of the client devices determines which of a plurality of home agents is associated with the selected client device.

4. The method according to claim 1, wherein an identification of a user of the selected client device determines which of a plurality of home agents is associated with the selected client device.

5. The method according to claim 1, wherein a central server is selected as the home agent associated with the selected client device.

6. The method according to claim 1, wherein the step of forwarding by the home agent further comprises the step of consulting a repository to determine through which of a plurality of foreign agents the selected client device is currently communicating.

7. A method of enabling location-independent packet routing in a short-range wireless networking environment, comprising steps of:
   providing one or more portable client devices, each of the client devices identified by a constant client address and equipped with a short-range wireless communications capability for communicating in the short-range wireless networking environment;
   providing one or more application servers, each of the application servers equipped for communicating over the short-range wireless networking environment;
   transmitting a packet from a selected one of the client devices to a selected one of the application servers, wherein the transmitted packet is received at a foreign agent through which the selected client device is currently communicating; and
   forwarding, by the foreign agent, the received packet to the selected application server.

8. The method according to claim 7, further comprising the steps of:
   consulting a repository, responsive to receiving the transmitted packet, to determine a network address and port number to be used for identifying the selected client device;
   modifying the received packet to use the determined network address and port number in place of a client network address and port number contained therein; and
   using the modified packet in the forwarding step.

9. A method of enabling location-independent packet routing in a short-range wireless networking environment, comprising steps of:
   providing one or more portable client devices, each of the client devices identified by a constant client address and equipped with a short-range wireless communications capability for communicating in the short-range wireless networking environment;
   providing one or more application servers, each of the application servers equipped for communicating over the short-range wireless networking environment; and
   transmitting packets between selected ones of the client devices and selected ones of the application servers using intermediary agents that enable transparent roaming by at least one of the selected client devices and/or the selected application servers.

10. The method according to claim 9, wherein the intermediary agents enable the transparent roaming using address translation of source addresses in outbound ones of the transmitted packets and of destination addresses in inbound ones of the transmitted packets.

11. The method according to claim 10, wherein at least two of the selected client devices share a particular home agent.

12. The method according to claim 11, wherein at least two of the selected client devices share a particular home agent.

13. The method according to claim 9, wherein the intermediary agents include a home agent associated with each of the selected client devices.

14. The method according to claim 13, wherein the home agent associated with at least one of the selected client devices is determined using administrative policy.

15. The method according to claim 11, further comprising the step of dynamically changing the home agent associated with at least one of the selected client devices.

16. The method according to claim 15, wherein the dynamically changing step occurs responsive to a failure of the home agent associated with the at least one selected client device.

17. The method according to claim 15, wherein the dynamically changing step further comprises the steps of:
   dynamically assuming, by a new home agent to be associated with the at least one selected client device, a network address used to identify the home agent that was previously associated with the at least one selected client device; and
   dynamically updating a repository which records the association of the previous home agent with the at least one selected client device, such that the repository now records the association of the new home agent with the at least one selected client device.

18. A system for enabling Location-independent packet routing in a short-range wireless networking environment, comprising:
   one or more portable client devices, each of the client devices identified by a constant client address and equipped with a short-range wireless communications capability for communicating in the short-range wireless networking environment;

one or more application servers, each of the application servers equipped for communicating over the short-range wireless networking environment; and intermediary agents for transparently transmitting packets between selected ones of the client devices and selected ones of the application servers even though at least one of the selected client devices and/or the selected application servers may roam from one location to another in the short-range wireless networking environment.

19. Computer program instructions embodied on one or more computer readable media, the computer program instructions adapted for enabling location-independent packet routing in a short-range wireless networking environment and comprising:

computer program instructions for transmitting a packet from a selected one of one or more portable client devices to a selected one of one or more application servers, each of the client devices and application servers equipped for communicating in the short-range wireless networking environment, wherein the transmitted packet is received at a foreign agent through which the selected client device is currently communicating; and computer program instructions for forwarding, by the foreign agent, the received packet to the selected application server.

* * * * *

UNITED STATES PATENT AND TRADEMARK OFFICE
CERTIFICATE OF CORRECTION

| | | |
|---|---|---|
| PATENT NO. | : 7,113,599 B2 | |
| APPLICATION NO. | : 10/688576 | |
| DATED | : September 26, 2006 | |
| INVENTOR(S) | : Richard Kent Neves et al. | |

It is certified that error appears in the above-identified patent and that said Letters Patent is hereby corrected as shown below:

Column 22, line 31: delete: "11. The method according to claim 10, wherein at least two of the selected client devices share a particular home agent." and insert instead: --11. The method according to Claim 9, wherein the intermediary agents include a home agent associated with each of the selected client devices.--

Column 22, line 37: delete: "13. The method according to claim 9, wherein the intermediary agents include a home agent associated with each of the selected client devices." and insert instead: --13. The method according to Claim 12, wherein the particular home agent is a central server.--

Column 22, line 40: delete: "14. The method according to claim 13, wherein the home agent associated with at least one of the selected client devices is determined using administrative policy." and insert instead: --14. The method according to Claim 11, wherein the home agent associated with at least one of the selected client devices is determined using administrative policy.--

Signed and Sealed this

Tenth Day of November, 2009

David J. Kappos
*Director of the United States Patent and Trademark Office*